(12) United States Patent
Dean et al.

(10) Patent No.: US 11,714,885 B2
(45) Date of Patent: Aug. 1, 2023

(54) ENCRYPTION KEY EXCHANGE PROCESS USING ACCESS DEVICE

(71) Applicant: Visa International Service Association, San Francisco, CA (US)

(72) Inventors: Christopher Dean, San Francisco, CA (US); Christian Aabye, Redwood City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/548,994

(22) Filed: Dec. 13, 2021

(65) Prior Publication Data

US 2022/0100828 A1 Mar. 31, 2022

Related U.S. Application Data

(63) Continuation of application No. 16/311,144, filed as application No. PCT/US2017/041220 on Jul. 7, 2017, now Pat. No. 11,238,140.

(Continued)

(51) Int. Cl.
*G06F 21/31* (2013.01)
*H04W 12/02* (2009.01)
(Continued)

(52) U.S. Cl.
CPC ............ *G06F 21/31* (2013.01); *H04L 9/3213* (2013.01); *H04W 4/80* (2018.02); *H04W 12/02* (2013.01);
(Continued)

(58) Field of Classification Search
CPC ....... G06F 21/31; G06F 21/62; H04L 9/3213; H04L 2209/56; H04L 9/0618;
(Continued)

(56) References Cited

U.S. PATENT DOCUMENTS 4,423,287 A * 12/1983 Zeidler ................. G07F 7/1016
380/45
5,280,527 A 1/1994 Gullman et al.
(Continued)

FOREIGN PATENT DOCUMENTS

CN 101515319 A 8/2009
CN 102460491 A 5/2012
(Continued)

OTHER PUBLICATIONS

"Contactless Mobile Payment", EMVCo., Contactless Mobile Payment Architecture Overview, Version 1.0, Jun. 2010, 28 pages.
(Continued)

*Primary Examiner* — Michael R Vaughan
(74) *Attorney, Agent, or Firm* — Kilpatrick Townsend & Stockton LLP

(57) ABSTRACT

Encryption key exchange processes are disclosed. A disclosed method includes initiating communication between a portable communication device including a token and a first limited use encryption key, and an access device. After communication is initiated, the portable communication device receives a second limited use key from a remote server via the access device. The portable communication device then replaces the first limited use key with the second limited use key. The second limited use key is thereafter used to create access data such as cryptograms that can be used to conduct access transactions.

20 Claims, 9 Drawing Sheets

Related U.S. Application Data

(60) Provisional application No. 62/360,768, filed on Jul. 11, 2016.

(51) Int. Cl.

| | | |
|---|---|---|
| *H04W 4/80* | (2018.01) | |
| *H04L 9/32* | (2006.01) | |
| *H04W 12/08* | (2021.01) | |
| *H04W 12/033* | (2021.01) | |
| *H04W 12/037* | (2021.01) | |
| *H04W 12/041* | (2021.01) | |
| *H04W 12/0431* | (2021.01) | |
| *H04W 12/0471* | (2021.01) | |

(52) U.S. Cl.
CPC ....... *H04W 12/033* (2021.01); *H04W 12/037* (2021.01); *H04W 12/041* (2021.01); *H04W 12/0431* (2021.01); *H04W 12/0471* (2021.01); *H04W 12/08* (2013.01); *H04L 2209/56* (2013.01)

(58) Field of Classification Search
CPC ............. H04L 2209/805; H04L 9/0891; H04L 9/3234; H04L 63/0428; H04L 63/068; H04W 4/80; H04W 12/02; H04W 12/033; H04W 12/037; H04W 12/041; H04W 12/0431; H04W 12/0471; H04W 12/08
See application file for complete search history.

(56) References Cited

U.S. PATENT DOCUMENTS

| | | |
|---|---|---|
| 5,301,231 A | 4/1994 | Abraham et al. |
| 5,548,282 A | 8/1996 | Escritt et al. |
| 5,613,012 A | 3/1997 | Hoffman et al. |
| 5,781,438 A | 7/1998 | Lee et al. |
| 5,883,810 A | 3/1999 | Franklin et al. |
| 5,892,900 A | 4/1999 | Ginter et al. |
| 5,930,767 A | 7/1999 | Reber et al. |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,163,771 A | 12/2000 | Walker et al. |
| 6,227,447 B1 | 5/2001 | Campisano |
| 6,236,981 B1 | 5/2001 | Hill |
| 6,267,292 B1 | 7/2001 | Walker et al. |
| 6,327,578 B1 | 12/2001 | Linehan |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,453,301 B1 | 9/2002 | Niwa |
| 6,592,044 B1 | 7/2003 | Wong et al. |
| 6,636,833 B1 | 10/2003 | Flitcroft et al. |
| 6,658,568 B1 | 12/2003 | Ginter et al. |
| 6,725,371 B1 | 4/2004 | Verhoorn, III et al. |
| 6,742,116 B1 | 5/2004 | Matsui et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,024,553 B1 | 4/2006 | Morimoto |
| 7,051,929 B2 | 5/2006 | Li |
| 7,069,249 B2 | 6/2006 | Stolfo et al. |
| 7,080,256 B1 | 7/2006 | Vedder |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,523,859 B2 | 4/2009 | Patel et al. |
| 7,548,889 B2 | 6/2009 | Bhambri et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,581,678 B2 | 9/2009 | Narendra et al. |
| 7,584,153 B2 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,650,314 B1 | 1/2010 | Saunders |
| 7,685,037 B2 | 3/2010 | Reiners et al. |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,765,281 B1 | 7/2010 | Crow et al. |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen et al. |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |

(56) References Cited

U.S. PATENT DOCUMENTS

| | | |
|---|---|---|
| 8,121,942 B2 | 2/2012 | Carlson et al. |
| 8,121,956 B2 | 2/2012 | Carlson et al. |
| 8,126,449 B2 | 2/2012 | Beenau et al. |
| 8,132,723 B2 | 3/2012 | Hogg et al. |
| 8,171,525 B1 | 5/2012 | Pelly et al. |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,271,395 B2 | 9/2012 | Dominguez et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren |
| 8,433,116 B2 | 4/2013 | Butler et al. |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,523,059 B1 | 9/2013 | Mullen et al. |
| 8,528,067 B2 | 9/2013 | Hurry et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | McGuire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | von Behren et al. |
| 8,651,374 B2 | 2/2014 | Brabson et al. |
| 8,656,180 B2 | 2/2014 | Shablygin et al. |
| 8,700,729 B2 | 4/2014 | Dua |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,850,527 B2 | 9/2014 | Chew et al. |
| 8,855,314 B2 | 10/2014 | Modave et al. |
| 8,856,539 B2 | 10/2014 | Weiss |
| 8,856,640 B1 | 10/2014 | Barr et al. |
| 8,887,308 B2 | 11/2014 | Grecia |
| 8,909,557 B2 | 12/2014 | Collinge et al. |
| 8,955,039 B2 | 2/2015 | Prakash et al. |
| 8,990,572 B2 | 3/2015 | Patefield-Smith et al. |
| 9,026,462 B2 | 5/2015 | Lin et al. |
| 9,037,491 B1 | 5/2015 | Lee |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,195,926 B2 | 11/2015 | Spodak |
| 9,208,482 B2 | 12/2015 | Laracey |
| 9,208,490 B2 | 12/2015 | Pitroda et al. |
| 9,218,479 B2 | 12/2015 | Collinge et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,361,619 B2 | 6/2016 | Varadarajan et al. |
| 9,411,601 B2 | 8/2016 | Zimmer et al. |
| 9,425,968 B2 | 8/2016 | Demeter et al. |
| 9,530,137 B2 | 12/2016 | Weiss |
| 9,680,942 B2 | 6/2017 | Dimmick |
| 10,846,694 B2 | 11/2020 | Wong et al. |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0049636 A1 | 4/2002 | Griffin et al. |
| 2002/0073045 A1 | 6/2002 | Rubin et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0061519 A1 | 3/2003 | Shibata et al. |
| 2003/0108204 A1 | 6/2003 | Audebert et al. |
| 2003/0130955 A1 | 7/2003 | Hawthorne |
| 2003/0182246 A1 | 9/2003 | Johnson et al. |
| 2003/0191709 A1 | 10/2003 | Elston et al. |
| 2003/0191945 A1 | 10/2003 | Keech |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0236632 A1 | 11/2004 | Maritzen et al. |
| 2004/0236672 A1 | 11/2004 | Jung et al. |
| 2004/0260646 A1 | 12/2004 | Berardi et al. |
| 2005/0027871 A1 | 2/2005 | Bradley et al. |
| 2005/0037735 A1 | 2/2005 | Coutts |
| 2005/0080730 A1 | 4/2005 | Sorrentino |
| 2005/0108178 A1 | 5/2005 | York |
| 2005/0156026 A1 | 7/2005 | Ghosh et al. |
| 2005/0177522 A1 | 8/2005 | Williams |
| 2005/0194452 A1 | 9/2005 | Nordentoft et al. |
| 2005/0199709 A1 | 9/2005 | Linlor |
| 2005/0238174 A1 | 10/2005 | Kreitzer |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0041655 A1 | 2/2006 | Holloway et al. |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0107044 A1 | 5/2007 | Yuen et al. |

(56) References Cited

U.S. PATENT DOCUMENTS

| | | |
|---|---|---|
| 2007/0118483 A1 | 5/2007 | Hill et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0255955 A1 | 11/2007 | Everett et al. |
| 2007/0276765 A1 | 11/2007 | Hazel et al. |
| 2007/0288377 A1 | 12/2007 | Shaked |
| 2007/0291995 A1 | 12/2007 | Rivera |
| 2008/0011823 A1 | 1/2008 | Patel et al. |
| 2008/0015988 A1 | 1/2008 | Brown et al. |
| 2008/0029598 A1 | 2/2008 | Fernandes et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0126260 A1 | 5/2008 | Cox et al. |
| 2008/0201264 A1 | 8/2008 | Brown et al. |
| 2008/0201265 A1 | 8/2008 | Hewton |
| 2008/0201577 A1 | 8/2008 | Tuliani |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0249948 A1 | 10/2008 | Kim et al. |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0305769 A1 | 12/2008 | Rubinstein |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048935 A1 | 2/2009 | Blanc et al. |
| 2009/0048953 A1 | 2/2009 | Hazel et al. |
| 2009/0048971 A1 | 2/2009 | Hathaway et al. |
| 2009/0068982 A1 | 3/2009 | Chen et al. |
| 2009/0106112 A1 | 4/2009 | Dalmia et al. |
| 2009/0106138 A1 | 4/2009 | Smith et al. |
| 2009/0106160 A1 | 4/2009 | Skowronek |
| 2009/0124234 A1 | 5/2009 | Fisher et al. |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0216681 A1 | 8/2009 | McCown |
| 2009/0248583 A1 | 10/2009 | Chhabra |
| 2009/0264102 A1 | 10/2009 | Parmar et al. |
| 2009/0276347 A1 | 11/2009 | Kargman |
| 2009/0281948 A1 | 11/2009 | Carlson |
| 2009/0294527 A1 | 12/2009 | Brabson et al. |
| 2009/0300351 A1 | 12/2009 | Lei et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0153267 A1 | 6/2010 | Ghaidan et al. |
| 2010/0161433 A1 | 6/2010 | White |
| 2010/0185545 A1 | 7/2010 | Royyuru et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0274712 A1 | 10/2010 | Mestre et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2010/0327054 A1 | 12/2010 | Hammad |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0038481 A1 | 2/2011 | Modave et al. |
| 2011/0040640 A1 | 2/2011 | Erikson |
| 2011/0047076 A1 | 2/2011 | Carlson et al. |
| 2011/0078081 A1 | 3/2011 | Pirzadeh et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0125597 A1 | 5/2011 | Oder, II et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park et al. |
| 2011/0238573 A1 | 9/2011 | Varadarajan |
| 2011/0240745 A1 | 10/2011 | Brown |
| 2011/0246317 A1 | 10/2011 | Coppinger |
| 2011/0246369 A1 | 10/2011 | de Oliveira et al. |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0070129 A1 | 3/2012 | Lin et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0089519 A1 | 4/2012 | Peddada |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143707 A1 | 6/2012 | Jain |
| 2012/0143752 A1 | 6/2012 | Wong et al. |
| 2012/0143754 A1 | 6/2012 | Patel |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |

(56) References Cited

U.S. PATENT DOCUMENTS

| | | |
|---|---|---|
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0254041 A1 | 10/2012 | Saxena et al. |
| 2012/0265631 A1 | 10/2012 | Cronic et al. |
| 2012/0271770 A1 | 10/2012 | Harris et al. |
| 2012/0284526 A1 | 11/2012 | Arnold et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2012/0317628 A1 | 12/2012 | Yeager |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0031006 A1 | 1/2013 | McCullagh et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder, II et al. |
| 2013/0097080 A1 | 4/2013 | Smets et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191227 A1 | 7/2013 | Pasa et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0268776 A1 | 10/2013 | Motoyama |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0275310 A1 | 10/2013 | Hammad et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040149 A1* | 2/2014 | Fiske ............... G06Q 20/3829 705/71 |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0052640 A1 | 2/2014 | Pitroda et al. |
| 2014/0061302 A1 | 3/2014 | Hammad |
| 2014/0068706 A1 | 3/2014 | Aissi |
| 2014/0074637 A1 | 3/2014 | Hammad |
| 2014/0074724 A1 | 3/2014 | Gordon et al. |
| 2014/0075496 A1 | 3/2014 | Prakash et al. |
| 2014/0108172 A1 | 4/2014 | Weber et al. |
| 2014/0108241 A1 | 4/2014 | Tunnell et al. |
| 2014/0108261 A1 | 4/2014 | Priest et al. |
| 2014/0108265 A1 | 4/2014 | Hayhow et al. |
| 2014/0110477 A1 | 4/2014 | Hammad |
| 2014/0114857 A1 | 4/2014 | Griggs et al. |
| 2014/0143137 A1 | 5/2014 | Carlson |
| 2014/0149285 A1 | 5/2014 | De et al. |
| 2014/0164243 A1 | 6/2014 | Aabye et al. |
| 2014/0188586 A1 | 7/2014 | Carpenter et al. |
| 2014/0207682 A1 | 7/2014 | Wolfond et al. |
| 2014/0244494 A1 | 8/2014 | Davis et al. |
| 2014/0244514 A1 | 8/2014 | Rodriguez et al. |
| 2014/0246490 A1 | 9/2014 | Graylin |
| 2014/0247822 A1 | 9/2014 | Herron et al. |
| 2014/0249945 A1 | 9/2014 | Gauthier et al. |
| 2014/0263625 A1 | 9/2014 | Smets et al. |
| 2014/0294701 A1 | 10/2014 | Dai et al. |
| 2014/0297534 A1 | 10/2014 | Patterson |
| 2014/0298027 A1 | 10/2014 | Roberts et al. |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |

(56) References Cited

U.S. PATENT DOCUMENTS

| | | |
|---|---|---|
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0351581 A1 | 11/2014 | Pritikin |
| 2014/0358796 A1 | 12/2014 | Smets et al. |
| 2014/0372308 A1 | 12/2014 | Sheets |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0074764 A1 | 3/2015 | Stern |
| 2015/0081544 A1 | 3/2015 | Schulz et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0116887 A1 | 4/2015 | Avestruz et al. |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0134537 A1 | 5/2015 | Hammad |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0172330 A1 | 6/2015 | Kaplan |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0278799 A1 | 10/2015 | Palanisamy |
| 2015/0287037 A1 | 10/2015 | Salmon et al. |
| 2015/0312038 A1 | 10/2015 | Palanisamy |
| 2015/0319158 A1 | 11/2015 | Kumnick |
| 2015/0332261 A1 | 11/2015 | Park et al. |
| 2015/0332262 A1 | 11/2015 | Lingappa |
| 2015/0339642 A1 | 11/2015 | Park et al. |
| 2015/0339664 A1 | 11/2015 | Wong et al. |
| 2015/0356560 A1 | 12/2015 | Shastry et al. |
| 2015/0363781 A1 | 12/2015 | Badenhorst |
| 2015/0371050 A1 | 12/2015 | Martini |
| 2015/0373762 A1 | 12/2015 | Raj et al. |
| 2016/0019512 A1 | 1/2016 | Buchheim et al. |
| 2016/0028550 A1 | 1/2016 | Gaddam et al. |
| 2016/0034880 A1 | 2/2016 | Roberts et al. |
| 2016/0036790 A1 | 2/2016 | Shastry et al. |
| 2016/0042263 A1 | 2/2016 | Gaddam et al. |
| 2016/0057619 A1 | 2/2016 | Lopez |
| 2016/0065370 A1 | 3/2016 | Le Saint et al. |
| 2016/0086073 A1 | 3/2016 | Narendra et al. |
| 2016/0092696 A1 | 3/2016 | Guglani et al. |
| 2016/0092872 A1 | 3/2016 | Prakash et al. |
| 2016/0092874 A1 | 3/2016 | O'Regan et al. |
| 2016/0103675 A1 | 4/2016 | Aabye et al. |
| 2016/0119296 A1 | 4/2016 | Laxminarayanan et al. |
| 2016/0132878 A1 | 5/2016 | O'Regan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0197725 A1 | 7/2016 | Hammad |
| 2016/0210628 A1 | 7/2016 | McGuire |
| 2016/0217452 A1 | 7/2016 | Wong et al. |
| 2016/0217461 A1 | 7/2016 | Gaddam et al. |
| 2016/0218875 A1 | 7/2016 | Le Saint et al. |
| 2016/0224976 A1 | 8/2016 | Basu et al. |
| 2016/0224977 A1 | 8/2016 | Sabba et al. |
| 2016/0232527 A1 | 8/2016 | Patterson |
| 2016/0239842 A1 | 8/2016 | Cash et al. |
| 2016/0269391 A1 | 9/2016 | Gaddam et al. |
| 2016/0308995 A1 | 10/2016 | Youdale et al. |
| 2017/0046696 A1 | 2/2017 | Powell et al. |
| 2017/0103387 A1 | 4/2017 | Weber |
| 2017/0109745 A1 | 4/2017 | Al-Bedaiwi et al. |
| 2017/0186001 A1 | 6/2017 | Reed et al. |
| 2017/0201520 A1 | 7/2017 | Chandoor et al. |
| 2017/0220818 A1 | 8/2017 | Nagasundaram et al. |
| 2017/0228723 A1 | 8/2017 | Taylor et al. |
| 2017/0295155 A1 | 10/2017 | Wong |
| 2017/0364903 A1 | 12/2017 | Lopez |
| 2018/0006821 A1 | 1/2018 | Kinagi |
| 2018/0075081 A1 | 3/2018 | Chipman |
| 2018/0247303 A1 | 8/2018 | Raj et al. |
| 2018/0262334 A1 | 9/2018 | Hammad |
| 2018/0268405 A1 | 9/2018 | Lopez |
| 2018/0324184 A1 | 11/2018 | Kaja et al. |
| 2018/0324584 A1 | 11/2018 | Lopez |
| 2020/0013054 A1 | 1/2020 | Upadhye |
| 2022/0122061 A1* | 4/2022 | Musil ................ G06Q 20/4016 |

FOREIGN PATENT DOCUMENTS

| | | |
|---|---|---|
| EP | 1028401 A2 | 8/2000 |
| EP | 1117077 A2 | 7/2001 |
| EP | 2156397 A1 | 2/2010 |
| JP | 0334641 | 2/1991 |
| JP | 2007513529 A | 5/2007 |
| JP | 2010004390 A | 1/2010 |
| JP | 2013255161 A | 12/2013 |
| KR | 20040004833 A | 1/2004 |
| WO | 0014648 A1 | 3/2000 |
| WO | 01035304 A1 | 5/2001 |
| WO | 0135304 A9 | 5/2002 |
| WO | 2004042536 A2 | 5/2004 |
| WO | 2004051585 A2 | 6/2004 |
| WO | 2005001751 A1 | 1/2005 |
| WO | 2006113834 A2 | 10/2006 |
| WO | 2007131956 | 11/2007 |
| WO | 2009032523 A1 | 3/2009 |
| WO | 2009136404 A2 | 11/2009 |
| WO | 2010078522 A1 | 7/2010 |
| WO | 2012068078 A2 | 5/2012 |
| WO | 2012098556 A1 | 7/2012 |
| WO | 2012136986 A1 | 10/2012 |
| WO | 2012136987 A1 | 10/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |
| WO | 2015095771 A1 | 6/2015 |
| WO | 2015159165 A1 | 10/2015 |
| WO | 2016109547 A1 | 7/2016 |
| WO | 2018013431 A2 | 1/2018 |
| WO | 2018013431 A3 | 2/2018 |

OTHER PUBLICATIONS

"EMV Contactless Specifications for Payment Systems", Book a Architecture and General Requirements, XP055402194, Mar. 2011, 124 pages.

"EMV Integrated Circuit Card Specifications for Payment Systems", Books 1-3, Application Specification, Version 4.3, Nov. 2011, 162 pages.

"EMV Integrated Circuit Card Specifications for Payment Systems", Book 2, Security and Key Management, Version 4.3, Nov. 2011, 174 pages.

"EMV Integrated Circuit Card Specifications for Payment Systems", Book 2, Security and Key Management, Version 4.2, XP-002732389, Jun. 2008, 177 pages.

"EMV Integrated Circuit Card Specifications for Payment Systems", Book 2 Security and Key Management, Version 4.1, May 2004, 187 pages.

(56) References Cited

OTHER PUBLICATIONS

"EMV Integrated Circuit Card Specifications for Payment Systems, Common Payment Application Specification", Version 1.0, Dec. 2005, 770 pages.
"Petition for Inter Partes Review of U.S. Pat. No. 8,533,860 Challenging Claims 1-30 Under 35 U.S.C. § 312 and 37 C.F.R. § 42.104", USPTO Patent Trial and Appeal Board, IPR 2016-00600, Feb. 17, 2016, 65 pages.
"What Makes a Smart Card Secure? A Smart Card Aliiance Contactless and Mobile Payments Council White Paper", Oct. 2008, 38 pages.
U.S. Appl. No. 14/046,828 , "Final Office Action", dated Mar. 29, 2019, 21 pages.
"U.S. Appl. No. 16/171,176", Device Including Encrypted Data for Expiration Date and Verification Value Creation, filed Oct. 25, 2018, 40 pages.
"U.S. Appl. No. 16/302,054", Methods of Distributing Tokens and Managing Token Relationships, filed Nov. 15, 2018, 62 pages.
U.S. Appl. No. 16/311,144 , "Advisory Action", dated Aug. 12, 2021, 3 pages.
U.S. Appl. No. 16/311,144 , "Final Office Action", dated Jun. 2, 2021, 16 pages.
U.S. Appl. No. 16/311,144 , "Non-Final Office Action", dated Jan. 26, 2021, 14 pages.
U.S. Appl. No. 16/311,144 , "Notice of Allowance", dated Sep. 13, 2021, 9 pages.
Ceipidor et al., "KerNees: A Protocol for Mutual Authentication between NFC Phones and POS Terminals for Secure Payment Transactions", 9th International ISC Conference on Information Security and Cryptology, 2012, pp. 115-120.
CN201480069311.1 , "Office Action", dated Jan. 7, 2019, 18 pages.
Doherty et al., "Dynamic Symmetric Key Provisioning Protocol (DSKPP)", CiteSeerX, Internet Engineering Task Force (IETF), ISSN: 2070-1721, Dec. 2010, 106 pages.
Doherty et al., "Internet Engineering Task Force (IETF) Dynamic Symmetric Key Provisioning Protocol (DSKPP)", XP055281540, Dec. 1, 2010.
Elliott et al., "The Use of Near Field Communication (NFC) Technology in Mobile Phones for Public Transport Ticketing", Department of Transport, Research Database, Version 1.2a, Nov. 11, 2009, 52 pages.
EP12718316.8 , "Notice of Opposition", dated Jan. 31, 2019, 24 pages.
EP12718316.8 , "Notice of Opposition", dated Feb. 15, 2018, 32 pages.
EP17828213.3 , "Extended European Search Report", dated Mar. 6, 2019, 7 pages.
EP17828213.3 , "Notice of Decision to Grant", dated Sep. 2, 2021, 2 pages.
EP17828213.3 , "Office Action", dated Apr. 16, 2020, 5 pages.
EP21192249.7 , "Extended European Search Report", dated Nov. 5, 2021, 8 pages.
EP2695148 , "Notice of Opposition", dated Feb. 9, 2018, 24 pages.
EP2695148 , "Opposition to European Patent", dated Sep. 26, 2018, 8 pages.
EP2695148 , "Reply to Notice of Opposition", 13 pages.
Kasper et al., "Subscriber Authentication in Mobile Cellular Networks with Virtual Software SIM Credentials using Trusted Computing", Mar. 2008, 6 pages.
PCT/US2017/041220 , "International Preliminary Report on Patentability", dated Jan. 24, 2019, 12 pages.
PCT/US2017/041220 , "International Search Report and Written Opinion", dated Jan. 5, 2018, 14 pages.
Radu , "Implementing Electronic Card Payment Systems", Artech House, Chapter-5, ProQuest Ebook Central, Available Online at: http://ebookcentral.proquest.com/lib/uspto-ebooks/detail.action?dociD=227605, 2002, pp. 125-145.
Radu , "Implementing Electronic Card Payment Systems", ProQuest Ebook Central, Chapter-6, Available Online at: http://ebookcentral.proquest.com/lib/uspto-ebooks/detail.action?dociD=227605, 2002, pp. 147-225.
Radu , "Implementing Electronic Card Payment Systems", ProQuest Ebook Central, Available Online at: http://ebookcentral.proquest.com/lib/uspto-ebooks/detail.action?dociD=227605,Appendix D, 2002, pp. 373-398.
Ruiter et al., "Formal Analysis of the EMV Protocol Suite", Theory of Security and Applications, Mar. 2011, 17 pages.
SG11201808998R , "Further Written Opinion", dated Nov. 25, 2020, 7 pages.
SG11201808998R , "Notice of Decision to Grant", dated Aug. 25, 2021, 5 pages.
SG11201808998R , "Written Opinion", dated Feb. 26, 2020, 7 pages.
Shoup et al., "Session Key Distribution Using Smart Cards", International Conference on the Theory and Applications of Cryptographic Techniques, May 1996, pp. 1-11.
CN201780042951.7 , "Office Action", dated Sep. 27, 2022, 16 pages.
SG10202110839V, "Written Opinion", dated Feb. 7, 2023, 12 pages.

* cited by examiner

ENCRYPTION KEY EXCHANGE PROCESS USING ACCESS DEVICE

CROSS-REFERENCES TO RELATED APPLICATIONS

This application is a continuation application of U.S. Non-Provisional application Ser. No. 16/311,144, filed Dec. 18, 2018, which is a National Stage of International Application No. PCT/US2017/041220 filed Jul. 7, 2017, which claims the benefit of U.S. Patent Application No. 62/360,768 filed Jul. 11, 2016, which is herein incorporated by reference in their entirety for all purposes.

BACKGROUND

Encryption keys that can be used to generate access data such as cryptograms are typically provisioned to portable communication devices over the air through cellular telephone networks. While such systems are effective, there are many portable communication device form factors that are capable of conducting access transactions, but are not capable of communicating with a remote provisioning server computer to receive such encryption keys. For example, payment cards, wearable devices such as rings and watches, and key fobs are capable of being used to conduct access transactions such as payment transactions as they may contain integrated circuits and short range communication capabilities (e.g., RF ID chips). However, they cannot receive encryption keys directly from a remote provisioning server computer over a cellular network, because they do not have long range communication capabilities. Such devices are typically pre-loaded with any encryption keys that are needed to conduct access transactions at the time of manufacture.

In addition, even if a portable communication device did have remote communication capabilities, there may be instances when the portable communication device may not be able to connect to the remote provisioning server computer. For example, cellular networks can go down or may be susceptible to dead zones (e.g., within a building that cannot receive a cellular signal). In such instances, the portable communication device may not be able to retrieve the encryption keys needed to conduct access transactions. As a result, the user of the portable communication device would be prohibited from conducting the desired transaction.

There is a need to provide for systems and methods that can allow for portable communication devices such as those that cannot receive communications over cellular networks (e.g., either permanently or temporarily) with the ability to receive encryption keys on a regular basis, so that access transactions can be conducted with the portable communication devices in a secure and reliable manner.

Embodiments of the invention address these and other problems, individually and collectively.

BRIEF SUMMARY

Embodiments of the invention can provide portable communication devices with encryption keys that can be used to generate access data such as cryptograms. This can be done even though the portable communication devices do not have long range communication capabilities and/or cannot access a remote provisioning server computer through a long range communication medium.

Some embodiments of the present invention provide techniques for enhancing the security of a communication device (e.g., a portable communication device) when conducting a transaction using the communication device. The techniques described herein can be used with a communication device that does not have a secure element. Embodiments of the invention can instead use limited-use encryption keys that have a limited lifespan. Once expired, they can no longer be used to conduct a transaction until the limited-use encryption keys are replenished. Such replenishment need not rely on long range communication with a remote provisioning server computer. In embodiments of the invention, the replenishment can occur via a short-range wireless communication or contact connection with an access device such as point of sale terminal. As such, portable communication devices such as wearable devices and payment cards may be provided with greater security, even though they may not have secure elements and/or remote, over-the-air communication capabilities.

One embodiment of the invention is directed to a method. The method comprises initiating communication between a portable communication device comprising a token and a first limited use key, and an access device, and then receiving, by the portable communication device, from a remote server via the access device, a second limited use key. The portable communication device is in short range communication or in contact with the access device. The portable communication device then replaces the first limited use key with the second limited use key.

Another embodiment of the invention is directed to a portable communication device comprising a processor, and a computer readable medium. The computer readable medium comprising code, executable by the processor to implement a method comprising: initiating communication between the portable communication device comprising a token and a first limited use key, and an access device; receiving from a remote server via the access device, a second limited use key, wherein the portable communication device is in short range communication or in contact with the access device; and replacing the first limited use key with the second limited use key.

Another embodiment of the invention is directed to a method. The method includes communicating, by an access device, with a portable communication device comprising a token and a first limited use key, and then receiving, by the access device, a second limited use key from a remote server computer. The access device then provides the second limited use key to the portable communication device. The portable communication device is in short range communication or in contact with the access device.

Another embodiment of the invention is directed to an access device comprising a processor, and a computer readable medium. The computer readable medium comprises code, executable by the processor, to implement a method comprising communicating with a portable communication device comprising a token and a first limited use key; receiving a second limited use key from a remote server computer; and providing to the portable communication device, the second limited use key. The portable communication device is in short range communication or in contact with the access device.

According to some embodiments, a method for enhancing the security of a communication device when conducting a transaction using the communication device may include receiving, from an access device, a limited-use key (LUK) that is associated with a set of one or more limited-use thresholds that limits usage of the LUK. The method may also include generating, by the communication device, a cryptogram using the LUK, and sending, by the communication device to an access device, a token instead of a real account identifier and the transaction cryptogram to conduct the transaction. The transaction can be authorized based on at least whether usage of the LUK has exceeded the set of one or more limited-use thresholds.

According to some embodiments, a communication device may include a processor; and a memory coupled to the processor and storing a mobile application that performs operations for enhancing security of the communication device when conducting transactions using the communication device. The operations may include receiving a limited-use key (LUK) that is associated with a set of one or more limited-use thresholds that limits usage of the LUK, generating a transaction cryptogram using the LUK, and sending a token instead of a real account identifier and the transaction cryptogram to conduct the transaction. The transaction may be authorized based on at least whether usage of the LUK has exceeded the set of one or more limited-use thresholds.

These and other embodiments of the invention are described in further detail below.

DETAILED DESCRIPTION

Figure 1:
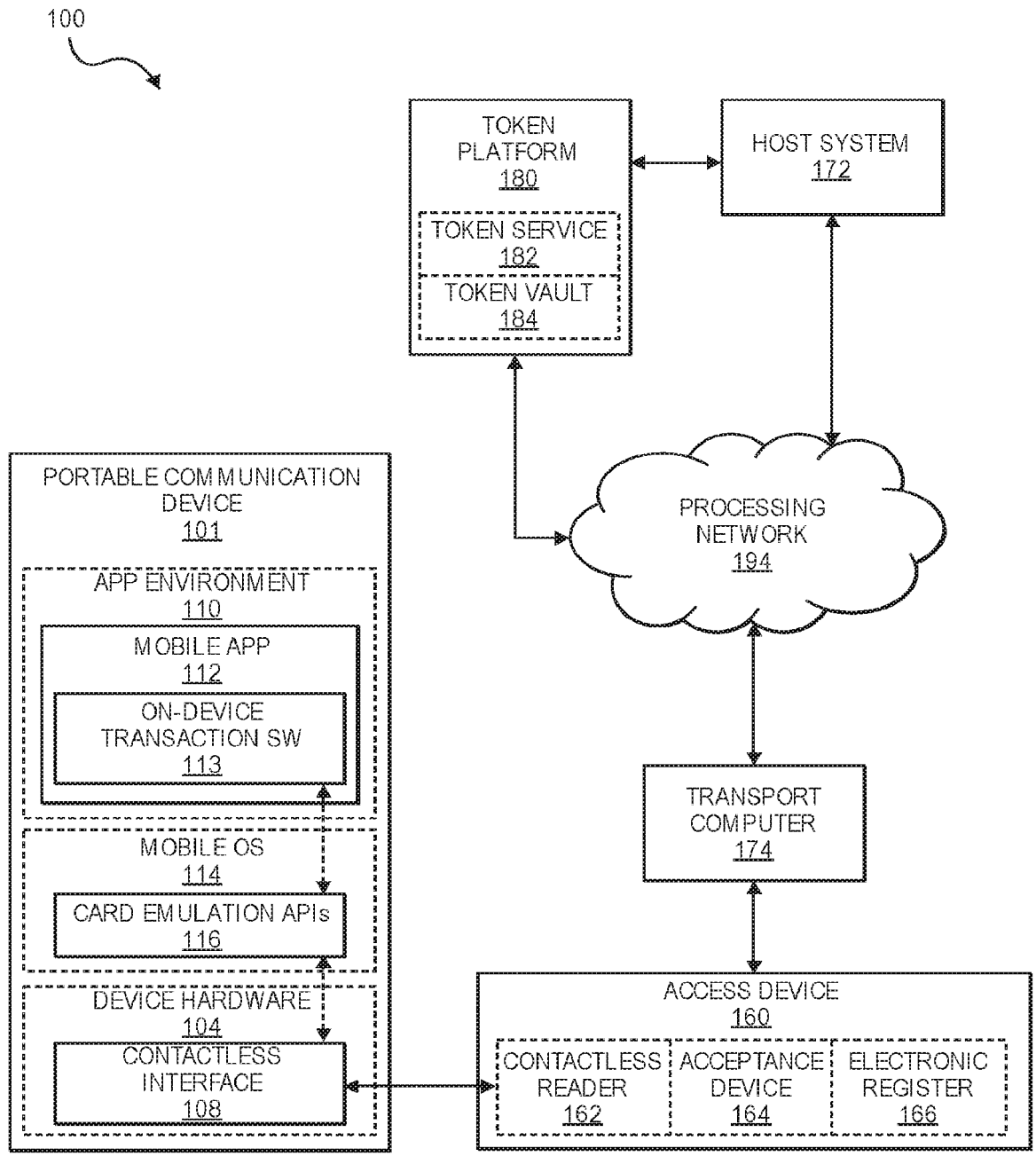
FIG. 1 illustrates a block diagram of an example of a system according to some embodiments.

HCE (host card emulation) based token deployments do not rely on secure hardware to store tokens. In a conventional HCE based token deployment, a limited use encryption key or "LUK" is provisioned to a mobile phone over the air along with a payment token. The LUK may be used by the mobile phone to generate a cryptogram. In a transaction, the cryptogram and the access token are passed from the mobile phone to an access device such a POS terminal. The access device transmits the cryptogram and the access token to a remote server computer, which then validates the cryptogram and continues to processes the access token if the cryptogram is valid.

While conventional methods for delivering LUKs to mobile phones are effective, many other form factors are not capable of communicating with a provisioning server to receive the LUK. For example, payment cards, wearable devices such as rings and watches, and key fobs are capable of being used to conduct payment transactions as they may contain integrated circuits and short range communication capabilities (e.g., RF ID chips), but they are not capable of communicating with a remote provisioning server computer using a cellular network.

There is a need to provide for systems and methods that can allow for portable communication devices such as those that cannot receive communications over cellular networks (e.g., either permanently or temporarily) with the ability to use access tokens (e.g., payment tokens) that have previously been provisioned onto the portable communication devices.

Embodiments of the present invention provide for methods that can be performed by communication devices that may or may not have secure elements. The techniques described herein can utilize card emulation technology (e.g., Host Card Emulation (HCE), etc.) to emulate a smartcard on a communication device (e.g., a portable communication device) to allow a mobile application running on the portable communication device to conduct contactless transactions. In the card emulation environment, a mobile application can access the contactless interface (e.g., a near-field communication (NFC) transceiver) of the portable communication device via the operating system (OS) of the portable communication device without using a secure element. As compared to secure element implementations, the card emulation approach reduces the technical and commercial complexities for device issuers and/or data processors.

By removing the control of payment functionalities and account credentials from the confines of a secure element, the tamper-resistant hardware based security provided by a secure element can no longer be relied on to safeguard access data. If a secure element is not present in a communication device, access data may instead be stored in a general memory of the portable communication device. As such, the access data may be susceptible to access by malware or viruses when stored in the portable communication device.

To enhance the security of a portable communication device when conducting transactions without using a secure element, instead of using static access data stored on a portable communication device which may be valid for the lifetime of an account, the techniques described herein provision a portable communication device with encryption keys that have a limited usage or lifespan. When the lifespan of the encryption keys is exhausted, the encryption keys can no longer be used to conduct valid access transactions. In order to conduct additional access transactions using the portable communication device, new encryption keys are replenished to the portable communication device. The new limited-use encryption keys provided to the portable communication device can be renewed or replenished by a payment network via access devices such as POS terminals during the lifetime of an account. Provisioning such limited-use encryption keys via access devices is desirable, especially in the case where the portable communication devices do not have the ability to connect to remote provisioning server computers over the air via long range communication networks such as cellular networks.

In some embodiments, passive portable communication devices are already personalized and tokenized when they are made. The limited use encryption key, or LUK, in a portable communication device may be updated by an NFC interaction with an access device such as a POS terminal. The access device is able to cause the portable communication device to overwrite the existing, expired, LUK, with a new one obtained from a tokenization system. Access devices can include this LUK update functionality into their firmware. When a user taps an HCE-enabled device to conduct a transaction against an access device such as enabled POS terminal, the POS terminal would read an AID (application identifier) through regular contactless protocols, and can then check the status of the LUK residing on the portable communication device. If the LUK status indicates that the LUK is expired, the access device will cause the portable communication device to update the old LUK with a new LUK. The new LUK may then be used to create a cryptogram, which can be used in an access transaction such as a payment transaction. This "write" process that is conducted on the portable consumer device can be similar to an issuer-directed PIN-on-card update using a direct sequence of APDU (application protocol data units) commands.

Prior to discussing the details of some embodiments of the present invention, description of some terms may be helpful in understanding the various embodiments.

A "communication device" may be a device that includes one or more electronic components (e.g., an integrated chip) that can communicate with another device. A "portable communication device" be a communication device that can be transported and operated by a user. The portable communication device can be configured to transmit and receive data or communications to and from other devices. A portable communication device may be in the form of a mobile device such as a mobile phone (e.g., smart phone, cellular phone, etc.), tablets, portable media player, personal digital assistant devices (PDAs), wearable computing device (e.g., watch or ring), electronic reader device, etc., or in the form of a card (e.g., smart card) or a fob, etc. Examples of portable communication devices may also include portable computing devices (e.g., laptops, netbooks, ultrabooks, etc.).

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "issuer" may typically refer to a business entity (e.g., a bank) that maintains an account for a user that is associated with a portable communication device such as an account enrolled in a mobile application installed on a portable communication device. An issuer may also issue account parameters associated with the account to a portable communication device. An issuer is an example of an "authorizing entity" which may operate an authorizing entity computer. Other examples of authorizing entities may include governmental agencies, transit agencies, etc.

An "access device" may be any suitable device that can access an external system. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a portable communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device.

"Short range communication" may include any suitable wireless communication between two devices that are local to each other. Typically, short range communication mechanisms can allow communications where two devices when they are within 20 meters, 10 meters, 1 meter, or 10 centimeters or 1 centimeter apart, but may not allow communication between them if they are separated by more than this. Such communication mechanisms may include NFC (near field communications), Bluetooth, Bluetooth Low Energy, Infrared, Wi-Fi, etc.

An "authorization request message" may be an electronic message that is sent to request authorization for a transaction. The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization. As noted above, in some embodiments, a payment processing network may generate or forward the authorization response message to the merchant.

A "token" may include a substitute identifier for some information. For example, a payment token may include an identifier for a payment account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "real account identifier" may include an original account identifier associated with a payment account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

"Account parameters" may refer to information relating to an account that can be used to conduct a transaction on the account. Examples of account parameters may include information that can be used to identify an account of the user (e.g., real account identifier, alternate account identifier, token, etc.), data or information relating to the status of the account, one or more keys that are used to generate cryptographic information, data or information relating to the one or more keys, etc. An account parameter can be semi-static or dynamic. A dynamic account parameter may be an account parameter that has a limited lifespan, and which once expired, can no longer be used to conduct a transaction until the account parameter is replenished, refreshed, or renewed. A dynamic account parameter may be replenished frequently during the lifetime of an account. A semi-static account parameter may be an account parameter that has an extended lifespan that is longer than a dynamic account parameter, and can be replenished less frequently than a dynamic account parameter or not at all during the lifetime of the account.

A "key" may refer to a piece of information that is used in a cryptographic algorithm to transform input data into another representation. Examples of keys may include encryption and decryption keys. Keys may also be symmetric or asymmetric. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "cryptogram" may refer to an encrypted representation of some information. A cryptogram can be used by a recipient to determine if the generator of the cryptogram is in possession of a proper key, for example, by encrypting the underlying information with a valid key, and comparing the result to the received cryptogram.

A "limited-use threshold" may refer to a condition that limits the usage of a piece of information. A limited-use threshold may be exceeded or exhausted when the underlying condition is met. For example, a limited-use threshold may include a time-to-live that indicates an amount of time for which a piece of information is valid, and once that amount of time has elapsed, the limited-use threshold is exceeded or exhausted, and the piece of information may become invalid and may no longer be used. As another example, a limited-use threshold may include a number of times that a piece of information can be used, and once the piece of information has been used for that number of times, the limited-use threshold is exceeded or exhausted, and the piece of information may become invalid and may no longer be used.

The transaction systems according to some embodiments provides a set of functionalities to manage the deployment and usage of account parameters for transactions conducted using a portable communication device. Account parameters may include a dynamic set of data and/or a semi-dynamic set of data. The dynamic set of data may be limited-use in the sense that the dynamic set of data can be used for only a limited time or a limited number of transactions, and may need to be renewed, refreshed, updated, or replenished when the dynamic set of data has exhausted its limited usage. For example, the dynamic set of data may include a limited-use encryption key (LUK) that is used to generate a transaction cryptogram during a transaction. The LUK may be associated with a set of one or more limited-use thresholds that limits the usage of the LUK, where once the usage of the LUK has exhausted or exceeded the set of one or more limited-use thresholds, a further transaction conducted using that LUK will be declined even if the underlying account is still in good standing. The set of one or more limited-use thresholds to enforce can be determined, for example, by an issuer of the account or by a payments platform that provides the transaction service. In other embodiments, the LUK can be alternatively or additionally be used to encrypt any suitable data from the portable communication device for secure transmission to a remote server computer.

The set of one or more limited-use thresholds may include at least one of a time-to-live indicating the duration of time for which the LUK is valid, a predetermined number of transactions for which the LUK is valid, and/or a cumulative transaction amount indicating the total transaction amount summed across one or more transactions for which the LUK is valid, or any combination thereof. For example, a LUK may be valid for a time-to-live of five days, and a transaction conducted using that LUK after five days have elapsed since the LUK was generated may be declined. As another example, a LUK may be valid for a predetermined number of five transactions, and a sixth transaction (and any subsequent transaction) conducted using that LUK may be declined. As a further example, a LUK may be valid for a cumulative transaction amount of five hundred dollars, and a transaction conducted using the LUK after that LUK has already been used for transactions totaling more than five hundred dollars may be declined.

The dynamic set of data may also include a key index that is associated with the LUK. The key index may include information pertaining to the generation of the LUK. For example, the key index may be used as a seed to generate its corresponding LUK. The key index may include time information (e.g., a timestamp) indicating when the LUK is generated, and/or may include a replenishment counter value indicating the number of times that the LUK has been renewed or replenished for a particular account, mobile application, or portable communication device. In some embodiments, the replenishment counter value may indicate the number of times the LUK has been replenished within a predetermined time period, and the replenishment counter value may reset when each predetermined time period elapses. This predetermined time period may correspond, for example, to the smallest unit of time determinable from the time information, although other predetermined time periods can be used. As an example, if the time information included in the key index indicates down to which hour the current LUK is generated, the counter value may indicate the number of times the LUK has been replenished in the hour. In some embodiments, the LUK may include an application transaction counter value indicating the number of transactions that has been previously conducted by a mobile application of the portable communication device at the time the LUK is generated, or may include a pseudo random number generated by a transaction service provider or by a suitable entity such as an issuer involved in processing the transaction. It should be understood that the key index may include one or more pieces of information pertaining to the generation of the LUK, and that one or more or all pieces of information included in the key index may be used as a seed to generate the LUK.

In some embodiments, the semi-static set of data may also include limited-use account parameters that have their own set of limited-use thresholds and/or own set of use restrictions. Although in some embodiments, an account identifier such as a PAN can be used and stored on the portable communication device, a PAN may be valid for the lifetime of an account and may be used for a wide range of different types of transactions (e.g., card present transactions, online transactions, etc.). As such, to further enhance the security of the portable communication device and to reduce the impact if the account parameters are compromised, in some embodiments, instead of using and storing a PAN in the portable communication device, an alternate account identifier (e.g., an alternate PAN) or a token that is a substitute for an account identifier may be used.

An account may have one or more alternate account identifiers and/or tokens associated with the account. Each alternate account identifier or token may be restricted to the type of transactions in which the alternate account identifier or token can be used. For example, an account may be associated with a first token that can only be used for online transactions and a second token that can only be used for transactions, and an online transaction conducted using the token will be declined. Other types of use restrictions may include restrictions on what type of merchant or which merchant and/or which geographical location that the alternate account identifier or token can be used.

In the transaction system, issuers of accounts may configure service portfolio characteristics to define the risk parameters and hence the limited-use thresholds of account parameters for accounts belonging to a particular portfolio. The limited-use thresholds can be used to manage the triggers for refreshing or replenishing account parameters on a provisioned portable communication device. To ensure that the transactions are processed according to the risk parameters specified in the service profile for an account, several core functions are implemented in the system to manage the deployment and usage of the account parameters. These functions may include provisioning, active account management, verification for payment, transaction processing, lifecycle management, and post-payment processing.

FIG. 1 illustrates a transaction system 100, according to some embodiments. The core components of transaction system 100 may include a token platform 180 to manage transactions conducted using portable communication device 101. Token platform 180 may include a remote computer, and may be implemented using one or more server computers, and can be associated with or be operated by a service provider such as an issuer, payment processor, and/or other suitable entities. Token platform 180 may manage accounts, provide verification functions for transactions, manage lifecycle messages from issuer/host system 172, as well as initiate lifecycle management events.

Token platform 180 may also implement a set of key management functions that manages issuer master derivation keys (MDKs) from which the limited-use keys (LUKs) are derived. Token platform 180 may implement a set of provisioning functions that manages the preparation and delivery of account parameters (e.g., alternate account identifier or token, initial LUK and associated key index, etc.) 170 for the initial setup of the mobile application 112 on portable communication device 101. Token platform 180 may also manage the accounts for processing by issuer/host system 172, and may perform active account management functions such as functions to generate account parameters based on requests or the risk profile of the account per token platform 180 risk management parameters. Token platform 180 may also maintain the account status for each account, and manage the replenishment or refreshing of the account parameters.

In some embodiments, token platform 180 may also implement or be provided with access to a token service 182 and/or a token vault 184. Token service 182 can be implemented as a software module or as a server computer, and can be used to generate, process, and maintain tokens, which are substitute identifiers for account identifiers. During a transaction, instead of using a real account identifier (e.g., a primary account number (PAN)) to identify the account of the user, a token can be used instead to identify the account. By using a token as a substitute for an account identifier, the risk of comprising real account information can be mitigated. As indicated above, a token may have its own set of use restrictions, and token service 182 may manage the deployment and usage of the tokens according to their use restrictions. Token service 182 may be in communication with token vault 184 where the generated tokens are stored. Specifically, token vault 184 may maintain a mapping between a token and the real account identifier (e.g., PAN) represented by the token. During transaction processing, token vault 184 may be queried to retrieve the real account identifier or PAN associated with the token. In some embodiments, the token vault 184 may be implemented as a database or database server.

In transactions system 100, portable communication device 101 can be used to conduct transactions facilitated by token platform 180. The components in portable communication device 101 may include device hardware 104, a mobile operating system (OS) 114, and an applications environment 110 in which mobile application 112 may reside. Device hardware 104 may include a contactless interface 108 that can interact with a contactless reader 162 of an access device 160. Examples of contactless interface 108 may include one or more radio frequency (RF) transceivers that can send and receive communications using near-field communications (NFC), or other radio frequency or wireless communication protocols such as Bluetooth, Bluetooth low-energy (BLE), Wi-Fi, iBeacon, etc. In some embodiments, contactless interface 108 may include an optical interface (e.g., a display screen) to present payment information in the form of an image such as a quick response (QR) code, or bar code, etc. to contactless reader 162 of access device 160 when contactless reader 162 includes an optical code scanner or reader.

Applications environment 110 of portable communication device 101 may host a mobile application 112 provided by a mobile application provider. For example, if the provider of mobile application 112 is an issuer, mobile application 112 may be a mobile banking application or a separate mobile payment application. If the provider is a mobile wallet provider such as a mobile network operator or third-party wallet provider that supports multiple issuers, mobile application 112 may be a mobile wallet application.

According to some embodiments, mobile application 112 may include on-device transaction software 113 (e.g., can be in the form of a software developer kit (SDK)) integrated into mobile application 112 to support transaction functionalities. The on-device transaction software 113 may perform functions to facilitate transactions such as to take the account parameters (e.g., LUK and associated key index), generate transaction cryptograms, and deliver them to mobile operating system (OS) 114 for transmission over contactless interface 108. The on-device transaction software 113 may also manage the initial service profile parameters (e.g., limited-use thresholds) that are provided after an account has been provisioned to ensure that requests for account parameter replenishment and activities are initiated and executed.

Mobile application 112 may perform functions to manage the risk profile of the account, maintain the account status, and replenish account parameters for each account based on the on-device threshold management parameters. Mobile application 122 may also provide consumer device cardholder verification method (CDCVM) functions for transactions, and perform a set of functions that processes and responds to messages in support of post-payment processing to limit the exposure of account parameters stored on the portable communication device. For example, post-payment processing may include periodic post-payment verification of payment transactions or using post-payment information to validate account parameters replenishment requests.

In secure element based implementations, a contactless application (e.g., a mobile wallet or payment application for contactless transactions) using a contactless interface to communicate with a contactless reader of an access device would have to be coded for and be executed on a secure element in order to gain access to the contactless interface. In some embodiments, portable communication device 101 may include a mobile operating system (OS) 114 that implements a set of card emulation application programming interfaces (APIs) 116 such as host card emulation (HCE) APIs to allow mobile application 112 to gain access to contactless interface 108 without requiring the use of a secure element. For example, card emulation APIs 116 may be coded for and be executed from mobile operating system (OS) 114 of portable communication device 101, and may include programming function calls to allow mobile application 112 to receive, process, and respond to transaction communications such as Application Protocol Data Unit (ADPU) commands sent from contactless reader 162. In this manner, portable communication device 101 is able to conduct contactless transactions without requiring access to a secure element on portable communication device 101.

Once portable communication device 101 and mobile application 112 have been provisioned with the account parameters, portable communication device 101 can conduct transactions by interacting with contactless reader 162 of access device 160 (e.g., at a merchant point-of-sale (POS) location). Contactless reader 162 may include one or more RF transceivers that can send and receive communications using NFC or other radio frequency or wireless communication protocols such as Bluetooth, BLE, Wi-Fi, iBeacon, etc. In some embodiments, contactless reader 162 may include an optical code scanner or reader to conduct transactions using QR codes, bar codes, etc. Access device 160 may also include a POS acceptance device 164 and/or electronic cash register 166. Also, although a contactless reader 162 and a contactless interface 108 are illustrated in FIG. 1, it is understood that embodiments of the invention may include contact readers and contact interfaces.

To conduct a transaction, a user of portable communication device 101 may place portable communication device 101 in proximity to contactless reader 162 of access device 160, or display an image such as a QR code or bar code on a screen of portable communication device 101 for scanning by contactless reader 162 of access device 160. Portable communication device 101 may provide access device 160 with an identifier (e.g., an alternate PAN, a token, etc.) to identify the account of the user and additional information such as the limited-use account parameters or information derived from the limited-use account parameters (e.g., transaction cryptograms generated from an LUK). For example, in some embodiments, an account identifier or token, and additional information (e.g., a transaction cryptogram, account parameters, etc.) can be transmitted to access device 160 in APDU responses that are responsive to a series of APDU commands received from access device 160. Access device 160 or a merchant computer coupled to access device 160 may then generate an authorization request message including the account identifier or token, and additional information such as a transaction cryptogram and other transaction data. Access device 160 may then forward the authorization request message to a transport computer 174 of an acquirer associated with the merchant. The authorization request message can then be sent by transport computer 174 to processing network 194.

Processing network 194 may include data processing subsystems, networks, and operations used to support and deliver authorization services, exception file services, transaction scoring services, and clearing and settlement services. An exemplary payment processing network may include VisaNet™. Payment processing networks such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

After receiving the authorization request message, processing network 194 may forward the authorization request message received from transport computer 174 to the issuer/host system 172 of the account of the user of portable communication device 101. After issuer/host system 172 receives the authorization request message, the authorization request message may be parsed, and the information in the authorization request message may be verified. For example, issuer/host system 172 may verify that the transaction cryptogram was generated by a valid LUK, and that the set of one or more limited-use thresholds associated with the LUK has not been exceeded. In some embodiments, some or all of the information in the authorization request message can also be sent to the token platform 180 for verification and processing. For example, if issuer/host system 172 does not have the capability to verify the transaction cryptogram, the processing network 194 or issuer/host system 172 may forward the transaction cryptogram to token platform 180 for verification. Alternatively, the verification of the cryptogram may have taken place before the authorization request message is received by the issuer/host system 172.

After the issuer/host system 172 decides if the transaction is authorized or not, it generates an authorization response message to indicate if the current transaction is authorized or not. The authorization response message is then sent back to processing network 194 by the issuer/host system 172. Processing network 194 then sends the authorization response message back to the transport computer 174. In some embodiments, processing network 194 may decline the transaction even if issuer/host system 172 has authorized the transaction (e.g., if a fraud risk score is too high or if limited-use account parameters are exceeded). Transport computer 174 then sends the authorization response message to the merchant computer and/or access device 160. The authorization response results, which may include transaction data for the transaction can be displayed by access device 160, or be printed out on a physical receipt.

At the end of the day, a clearing and settlement process can be conducted by processing network 194. A clearing process is a process of exchanging financial details between an acquirer and an issuer to facilitate posting to a user's payment account and reconciliation of the user's settlement position.

As illustrated above, once a portable communication device has been provided with the appropriate account parameters, the portable communication device can be used to conduct a contactless transaction, e.g., by placing portable communication device in proximity to a contactless reader of an access device. Depending upon the capabilities of the access device, a contactless transaction conducted using the techniques described herein can be processed as if the transaction is being performed with an integrated chip card (referred to as "integrated chip based transaction"), or as if the transaction is being performed with a magnetic stripe card (referred to as "magnetic stripe based transaction"). In some embodiments, the contactless transaction times using the card emulation techniques described herein may be similar to those of secure element based implementations. For example, in some embodiments, a contactless transaction using card emulation may take less than 500 milliseconds to complete.

Figure 2:
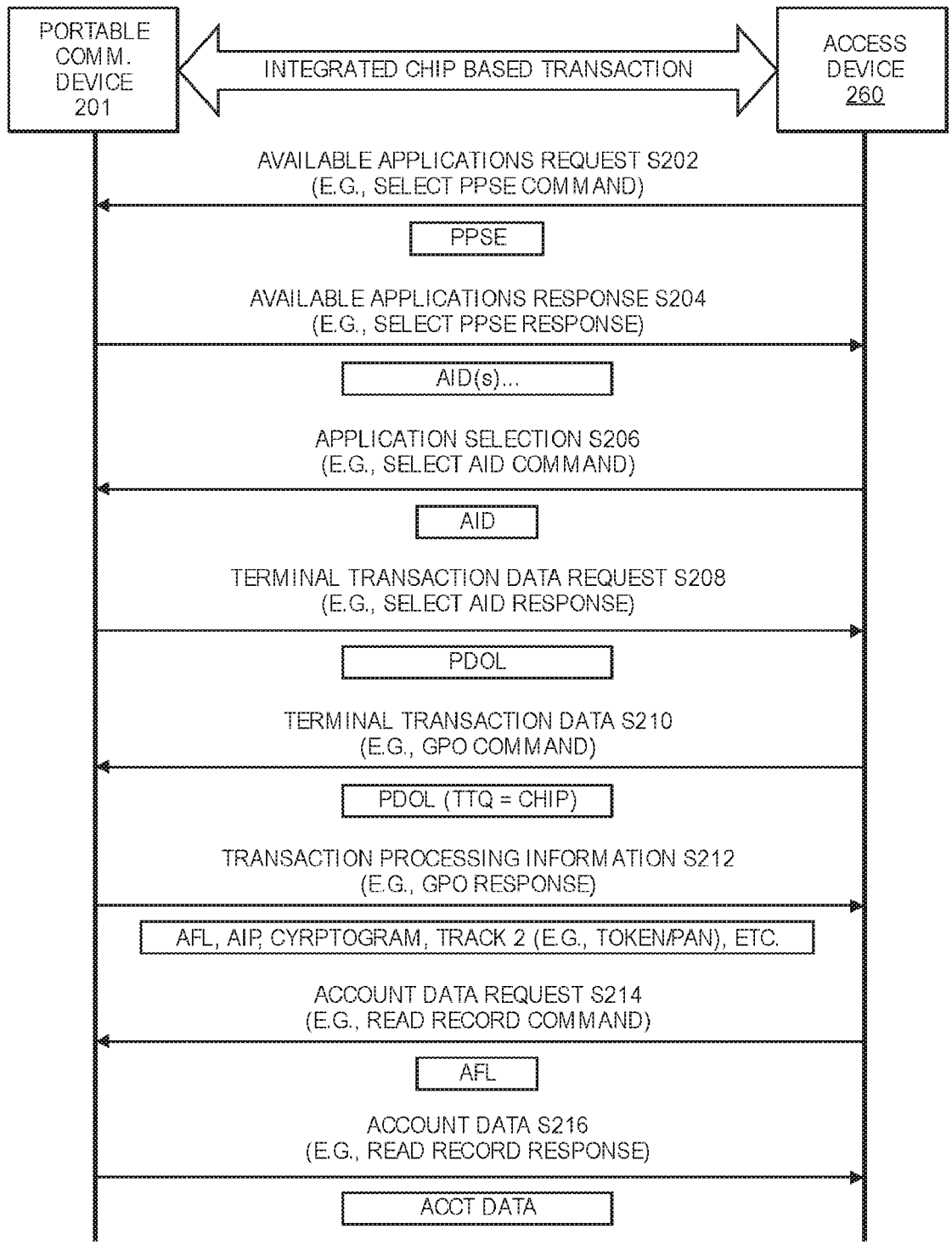
FIG. 2 illustrates a communication flow diagram of an example of executing an integrated chip based transaction, according to some embodiments.

FIG. 2 illustrates an example communication flow between a portable communication device 201 and an access device 260 during an integrated chip based transaction. In some embodiments, the communication flow may include the exchange of multiple messages between a payment device and an access device using near field communications technology for a single payment transaction. In the flow, there may be multiple messages (e.g., at least six or eight messages) that pass between the portable communication device 201 and the access device 260 in a single physical interaction (e.g., a tap) between the devices) through a wireless communication medium using a short range communication protocol or mechanism. In some embodiments, the communications can be in the form of ADPU commands and responses. However, it should be understood that other messages, messaging protocols, or formats can be used to exchange information to conduct the transaction. The communications can be carried out between a mobile application running on portable communication device 201 and a contactless reader of access device 260.

In the initiation of a transaction, the access device 260 detects the presence of portable communication device 201 in proximity to a contactless reader of access device 260. The access device 260 may send an available applications request S202 to portable communication device 201 to request information on which payment application(s) (e.g., a list of AID(s)) may be available on the mobile application of portable communication device 201. In some embodiments, the available application(s) request S202 may be in the form of a select PPSE command. The available applications request S202 may include a payment environment identifier (e.g., a PPSE name such as "2PAY.SYS.DDF01") to identify the payment environment supported by access device 260 and the mobile application.

Upon receiving the available applications request S202, the mobile application of portable communication device 201 may identify and process the request by recognizing the payment environment identifier (e.g., PPSE name) included in the request, and respond by sending an available applications response S204 back to access device 260. The available applications response S204 may include a list of available AIDs, and may include the payment environment identifier (e.g., PPSE name) as the dedicated file name. In some embodiments, the available applications response S204 may be in the form of a select PPSE response and may include PPSE file control information (FCI). For example, the available applications response S204 may include a directory entry for each available AID. If the mobile application supports only one AID (irrespective of the number of accounts related to that AID), the mobile application may respond with a single directory entry for the supported AID. If the mobile application supports an account with multiple AIDs, the mobile application may respond with a directory entry for each of the supported AIDs. Each directory entry may include information such as the AID, an application label associated with the AID (e.g., a mnemonic associated with the AID), an application priority indicator indicating the priority of the AID, a kernel identifier indicating the application's kernel preference, and/or additional information relating to the particular AID. The available application (s) response s204 may also include other data such as FCI issuer discretionary data.

When access device 260 receives the available applications response S204, access device 204 may select a suitable application from the list of applications received in the available applications response S204 (e.g., by selecting an AID from the available AID(s) received in the available application(s) response S204). In some embodiments, the selected AID can be the highest priority AID available on the mobile application that is supported by access device 260. Access device 260 may send an application selection S206 with the selected AID to the mobile application of portable communication device 201 to continue the transaction. In some embodiments, the application selection 206 can be in the form of a select AID command.

Upon receiving the application selection S206, the mobile application of portable communication device 201 may send a terminal transaction data request S208 to request transaction data from access device 260 which may be needed to execute the transaction using the selected application/AID. In some embodiments, the terminal transaction data request S208 may be in the form of a select AID response and may include AID file control information (FCI) with the selected AID as the dedicated file name. The terminal transaction data request S208 may include a list of transaction data identifiers to request the appropriate data from access device 260, and the list of transaction data identifiers can be in the form of a processing options data object list (PDOL). The transaction data requested by the mobile application for the transaction may include terminal transaction qualifiers (TTQ), authorized amount, other amount, terminal country code, terminal verification results, transaction currency code, transaction data, transaction type, and/or an unpredictable number. The terminal transaction data request S208 may also include other data such as FCI issuer discretionary data, application program identifier, and language preference.

After receiving the terminal transaction data request S208, access device 260 may send, to the mobile application of portable communication device 201, the terminal transaction data S210 requested by the mobile application. In some embodiments, the terminal transaction data S210 may be sent in the form of a get processing options (GPO) command, and may include the requested terminal transaction data in a processing options data object list (PDOL). In some embodiments, the terminal transaction data S210 (e.g., terminal transaction qualifiers (TTQ)) may include a transaction type indicator indicating whether access device 260 supports integrated chip based transactions or magnetic stripe based transactions. Thus, in the integrated chip based transaction, access device 260 may send a transaction type indicator in the terminal transaction data S210 to indicate that access device 360 supports integrated chip based transactions. In some embodiments, the terminal transaction data S210 (e.g., terminal transaction qualifiers (TTQ)) may also include a consumer verification method (CVM) requirement indicator to indicate whether a CVM is required by access device 260 for the transaction, and also one or more CVM type indicators indicating the types of CVM supported by access device 260. Examples of CVMs that may be supported by access device 260 can include online PIN, signature, and/or consumer device CVM (CDCVM) such as a passcode used on portable communication device 201 to unlock the screen or mobile application.

Once the mobile application of portable communication device 201 receives terminal transaction data S210, the mobile application may increment its Application Transaction Counter (ATC), generate dynamic transaction processing information using at least some of the received terminal transaction data S210, and send a set of transaction processing information S212 including the generated dynamic transaction processing information to access device 260. In some embodiments, the transaction processing information S212 can be sent as a GPO response. In some embodiments, the transaction processing information S212 may include application file locators (AFLs) that can be used as file address(es) by access device 260 to read account data stored on portable communication device 201, and an application interchange profile (AIP) that can indicate the capabilities of the mobile application.

For an integrated chip based transaction, the transaction processing information S212 may include a transaction cryptogram dynamically generated using the LUK, track-2 equivalent data, and addition data such as issuer application data (IAD), form factor indicator (FFI), card transaction qualifiers (CTQ), cryptogram information data (CID), the updated ATC, and/or an application PAN sequence number (PSN). In some embodiments, the issuer application data (IAD) may include a length indicator indicating the length of the IAD, cryptogram version number (CVN) indicating the version of the transaction cryptogram, a derived key indicator (DKI) that can be used to identify a master key (e.g. a master key associated with the issuer used in generation of the LUK), card verification results (CVR), a wallet provider ID, and/or derivation data such as the key index that was used in the generation of the LUK.

The card verification results (CVR) may include information about the CVM verifying entity and the CVM verified type for the transaction. The CVM verifying entity is used to indicate which entity is performing the verification of the CVM for the transaction. The verification entity may be the access device (or terminal), a co-residing secure application, a trusted execution environment application, the mobile application itself, a remote server (e.g., the cloud), or the mobile operating system. The CVM verified type is used to indicate the CVM method used for the transaction. The CVM method may be a passcode, biometric (e.g., fingerprint), pattern lock (e.g., for a screen lock), signature, or online PIN.

If the terminal transaction data S210 received from access device 260 indicates that the CVM supported by access device 260 is a CDCVM, the CVM verifying entity and the CVM verified type can be set according to the configuration parameters of the account. For example, if the account supports CVM using a passcode that is verified by the mobile operating system of portable communication device 201, the CVM verifying entity can be set to the mobile operating system, and the CVM verified type can be set to indicate that the CVM is a passcode. In some embodiments, a CDCVM performed indicator can be included in the card transaction qualifiers (CTQ) to indicate whether the CVM verifying entity has successfully verified the user using the CDCVM indicated by the CVM verified type.

If the terminal transaction data S210 received from access device 260 indicates that a CVM is not required, the CVM verifying entity and the CVM verified type can be set to indicate that no CVM was verified.

The form factor indicator (FFI) may include information about portable communication device 201, such as a form factor indicator version number indicating the version of the form factor indicator, an indicator indicating the device type, and device feature indicators indicating what features are supported by portable communication device 201. The form factor indicator may indicate that portable communication device 201 is a standard card (e.g., ID-1 card type as specified in ISO 7811), a mini-card, a non-card form factor (e.g., key fob, watch, wristband, ring, sticker, etc.), or a mobile phone. The feature indicators may indicate whether portable communication device 201 is capable of using a passcode (can be separate from a PIN that is used during transactions), has a signature panel, has a hologram, has support for card verification values (e.g., CVV2), is capable of two-way messaging to exchange identifying information between the issuer and the user, and/or has support for using credentials (e.g., LUK, token, etc.).

After access device 260 receives the transaction processing information S212, access device 260 may send an account data request S214 to the mobile application of portable communication device 201 to read additional account data that may be stored on portable communication device 201. In some embodiments, the account data request S214 may be in the form of a read record command, and may include an application file locator (AFL) indicating the address or location of the account data that access device 260 is attempting to read. The AFL included in the account data request S214 may correspond to an AFL in the transaction processing information S212 provided from portable communication device 201.

In response to receiving the account data request S214 from access device 260, portable communication device 201 may send the account data S216 stored at the location indicated by the AFL to access device 260. In some embodiments, the account data S216 may be sent in the form of a read record response. The account data S216 may include, for example, application usage control that indicates the issuer's restrictions on the usage and services allowed for the application, the cardholder's name, customer exclusive data, issuer country code, token requester ID (e.g., if a token is used), and/or other account related data that is accessible at the AFL location.

In the process steps illustrated in FIG. 2, any of the communications (e.g., any of steps S204, S208, 2012, or S216) from the portable communication device 201 may include an indication that the current LUK (an example of a first limited use key) present on the portable communication device is expired or otherwise needs to be replenished. The portable communication device 201 can do this on its own or may do this in response to a query from the access device 260 (e.g., in steps S202, S206, S210, and/or S214). If the access device 360, the portable communication device 201, or a remote computer determines that the LUK is expired or will expire very soon, then the access device 260 may send a request for a new LUK (an example of a second limited use key) to the token platform 180 via the transport computer 174 and/or the processing network 194. The token platform 180 may then respond with a new LUK which may be sent to the access device 160, 260 via the processing network 194 and/or the transport computer 174. Once received, the access device 160, 260 may provide it to the portable communication device 101, 201 in any of the steps shown in FIG. 2 (e.g., in steps S202, S206, S210, and/or S214). The access device 160, 260 may be in short range communication (e.g., via NFC, Bluetooth or Wi-Fi) or in contact with the portable communication device 101, 201 when the new LUK is received by the portable communication device 101, 201 from the access device 160, 260. After the portable communication device 101, 201 has received the new LUK, the portable communication device 101, 201 may then write the new LUK over the prior LUK. The new LUK may then be used to generate cryptograms for subsequent transactions conducted by the portable communication device 101, 201.

In a specific illustration, in the application selection step S206 and the subsequent terminal transaction data request S208, the access device 260 may query a transaction verification log (described below) in the portable communication device 201 to determine a current status of the LUK on the portable communication device 201. In some embodiments, the access device 260 may check the value of a key index (which indicates when the current LUK was generated), a timestamp and/or a transaction counter on the portable communication device 201 and may come to a determination that the LUK is expired or about to expire. LUK expiration parameters may be stored on the access device 260 to make this determination. If the access device 260 determines that the current LUK is expired, and that a new LUK is needed, then it may send a request to a remote computer (e.g., in the processing network, token platform, or host system) for the new LUK before continuing with the actual payment transaction messaging. After the access device 260 receives the new LUK, it may provide it to the portable communication device 201, and the transaction messaging may begin where it left off, or the entire sequence of messaging may start over. If the access device 260 determines that the LUK is about to expire but can be used for the current transaction, then the access device 260 may include an indicator indicating that a LUK replacement is needed in an authorization request message to the remote computer. As will be explained below, the remote computer may then provide the new LUK in an authorization response message to the access device 260. In yet other embodiments, the access device 260 may not make any determination as to whether or not the current LUK on the portable communication device 201 is expired or is about to expire. In other embodiments, a remote computer may make this determination.

In the above-described process, the new LUK is provided during an actual payment transaction process. In other embodiments, the user may use the portable communication device to interact with an access device to obtain a new LUK for the portable communication device in a transaction that is only intended to update the LUK (and is not a payment transaction).

As noted above, for implementations using a mobile payment application in a passive wearable device, HCE still can use limited use keys to be refreshed at a time defined by the issuer—commonly a cumulative transaction amount, a number of transactions, a set amount of time—or a combination of all three. This can be achieved in a number of ways, and it is preferred that the end user experience be non-intrusive or invisible to the user. For example, in some embodiments, an issuer may configure account logic to use a fixed transaction count as an LUK guard rail. Terminal or access device firmware can be updated with additional logic to be able to identify the particular portable communication device type (e.g., wearable device type), as well as connectivity to the tokenization system and the ability to perform pre-payment actions. When the user presents the portable communication device to a terminal for payment, data such as a token cryptogram is presented to the terminal, which knows locally, for that device type, that it is about to meet or exceed its transaction or time limit, or it can pass this information to the issuer as part of an ARQC (authorization request cryptogram) payload.

In some embodiments, the access device or the POS terminal can communicate with the token service system as a trusted connection and retrieve a new LUK appropriate for that wearable and that token/PAN. The access device or POS terminal can then prompt the user with an appropriate message to tap again to complete the transaction, while updating the LUK via NFC.

In other embodiments, the access device or the POS terminal passes the token cryptogram in the clear along with other ARQC data. The issuer then approves the transaction and sends a new LUK back down to the terminal. The access device or POS terminal then displays or provides a successful transaction message to the user, but asks the user to tap their wearable or other portable communication device one additional time against the terminal to complete the updating of the portable communication device.

Figure 3:
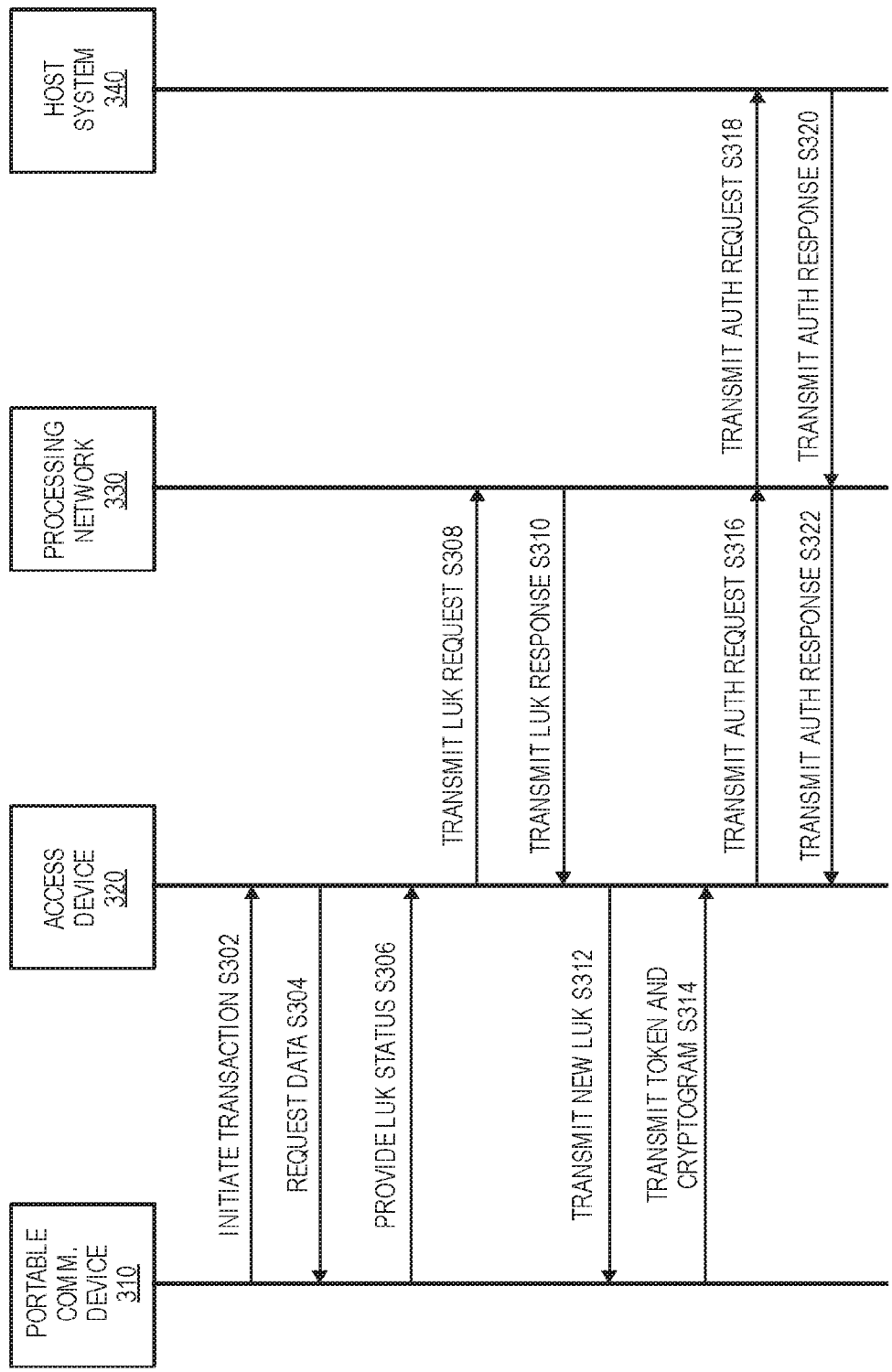
FIG. 3 shows a flow diagram illustrating a method for provisioning a limited use key, according to some embodiments.

FIG. 3 shows a flow diagram illustrating an embodiment of the invention. In the flow in FIG. 3, a new LUK is requested through an access device prior to the transmission of an authorization request message for the transaction to a host system.

FIG. 3 shows a portable communication device 310, an access device 320, a processing network 330, and a host system 340, each in operative communication with each other. For clarity of illustration, other entities (e.g., the token platform and a transport computer) that can be in the process flow in FIG. 3 have been omitted. It is understood that such entities may optionally be present in the flow as described above with respect to FIG. 1.

In step S302, a transaction is initiated between the portable communication device 310 and the access device 320. The portable communication device 310 may be tapped against a reader in the access device 320. In some embodiments, this can start the series of messages that pass between the portable communication device 310 and the access device as shown in FIG. 2.

In step S304, the access device 320 requests data from the portable communication device 310. As mentioned above, in some embodiments, the request for data may occur in any of the messages that pass from the access device 260 to the portable communication device 201 in FIG. 2 (e.g., steps S202, S206, S210, S214). In other embodiments, the request may be a stand-alone request that is separate from the messages illustrated in FIG. 2.

In step S306, the portable communication device 310 transmits an LUK status to the access device 320. In some embodiments, the current LUK status may be passed in any of the messages from the portable communication device 310 to the access device 260 in FIG. 2 (e.g., steps S204, S208, S212, S216). In other embodiments, the request may be a stand-alone request that is separate from the messages illustrated in FIG. 2.

In step S308, the access device 320 transmits an LUK update request to the processing network 330 after the access device 320 (and/or the portable communication device 310) determines that the current LUK on the portable communication device 310 is expired or will expire soon. In some embodiments, the LUK update request may be in the form of an authorization request message such as an ISO 8583 message, but may contain no amount, zero dollars, or a nominal amount (e.g., $0.03) to indicate that it is not requesting authorization for a transaction, but is requesting a new LUK. It may alternatively including an indicator (e.g., a flag) which indicates that it is requesting an LUK and is not seeking transaction approval. The LUK update request may also include a token that corresponds to the current LUK.

After the LUK update request is received by the processing network 330, it may perform an evaluation to determine if the portable communication device 310 is authorized to receive a new LUK (e.g., by checking the current transaction data to determine if it does or does not suggest fraud, and/or verifying that the current LUK is in fact expired or about to expire). The processing network 330 may also communicate with a token platform (e.g., token platform 180 in FIG. 1) and/or an issuer/host system (e.g., host system 172 in FIG. 1) to determine if a new LUK can be issued. The processing network 330 may supply the token in the LUK update request to the token platform 180. In some cases, the real account identifier may be determined using the token.

In step S310, after the processing network 330 receives the LUK request and determines that a new LUK can be issued, the processing network 330 transmits an LUK response with the new LUK to the access device 320. The processing network 330 may also store information regarding the issuance of the new LUK for later transaction processing.

In step S312, after the access device 320 receives the LUK response, the access device 320 transmits the new LUK to the portable communication device 310. In some embodiments, the access device 320 may request that the user present the portable communication device 310 to the access device 320 to receive the new LUK. The portable communication device 310 may then store the new LUK in favor of the previously stored LUK. In some embodiments, the previously stored LUK may be deleted so that it may not be re-used.

In step S314, after the portable communication device 310 receives the new LUK, the portable communication device 310 can then be used to initiate an authorization process for the current transaction. In some instances, if the transaction being conducted is a contactless one, the access device 320 may prompt the user to place the portable communication device 310 near the access device 320 again.

A series of message exchanges between the portable communication device 310 and the access device 320, such as those described above with respect to FIG. 2 may then take place. The portable communication device 310 may generate a cryptogram using the new LUK, and can transmit the cryptogram and the token corresponding to the new LUK to the access device 320. The token may be a static or semi-static token which may have been previously stored on the portable communication device 310.

In step S316, the access device 320 transmits an authorization request message with the token, the cryptogram, and a transaction amount to the processing network 330 The processing network 330 may receive the authorization request, and may then determine a real account identifier associated with the token in the authorization request message. It may do so by communicating with the previously described token platform. Once the real account identifier is received by the processing network 330, it may modify the authorization request message so that it contains the real account identifier.

The processing network 330 may also verify that the cryptogram that was generated with the new LUK that was received with the token is valid, and that the particular transaction being conducted is also consistent with the permissions provided by the cryptogram generated by the new LUK. In some embodiments, a computer in the processing network 330 may independently generate a cryptogram from an independently generated LUK (using previously stored information) or a stored copy of the current LUK that is present on the portable communication device 310, and may compare the independently generated cryptogram with the cryptogram received in the authorization request message.

In step S318, after the processing network 330 determines that the transaction being conducted is valid for the token and the cryptogram, the processing network 330 may transmit the authorization request message with the real account identifier, optionally the cryptogram or validation data associated with the cryptogram, and the transaction amount to the host system 340. The host system 340 may thereafter determine if the transaction should or should not be authorized. The host system 340 could independently verify that the transaction being conducted is consistent with the cryptogram. In such embodiments, the host system 340 may have received the information needed to verify the cryptogram from the processing network 330. The host system 340 may also perform its own transaction security checks (e.g., fraud checks) and may determine if the user has sufficient credit or funds to fund the transaction. After the host system 340 has made this determination, the host system 340 may then generate an authorization response message.

In step S320, the host system 440 may then transmit the authorization response message back to the processing network 322. The processing network 330 may retrieve the token associated with the real account identifier from the token platform, and may generate a modified authorization response message with the token.

In step S322, after the modified authorization response message is generated, the processing network 430 may transmit the modified authorization response message to the access device 420.

At the end of the day or at any other suitable time, a clearing and settlement process can take place between the processing network S430, a transport computer (not shown), and the host system 440.

Figure 4:
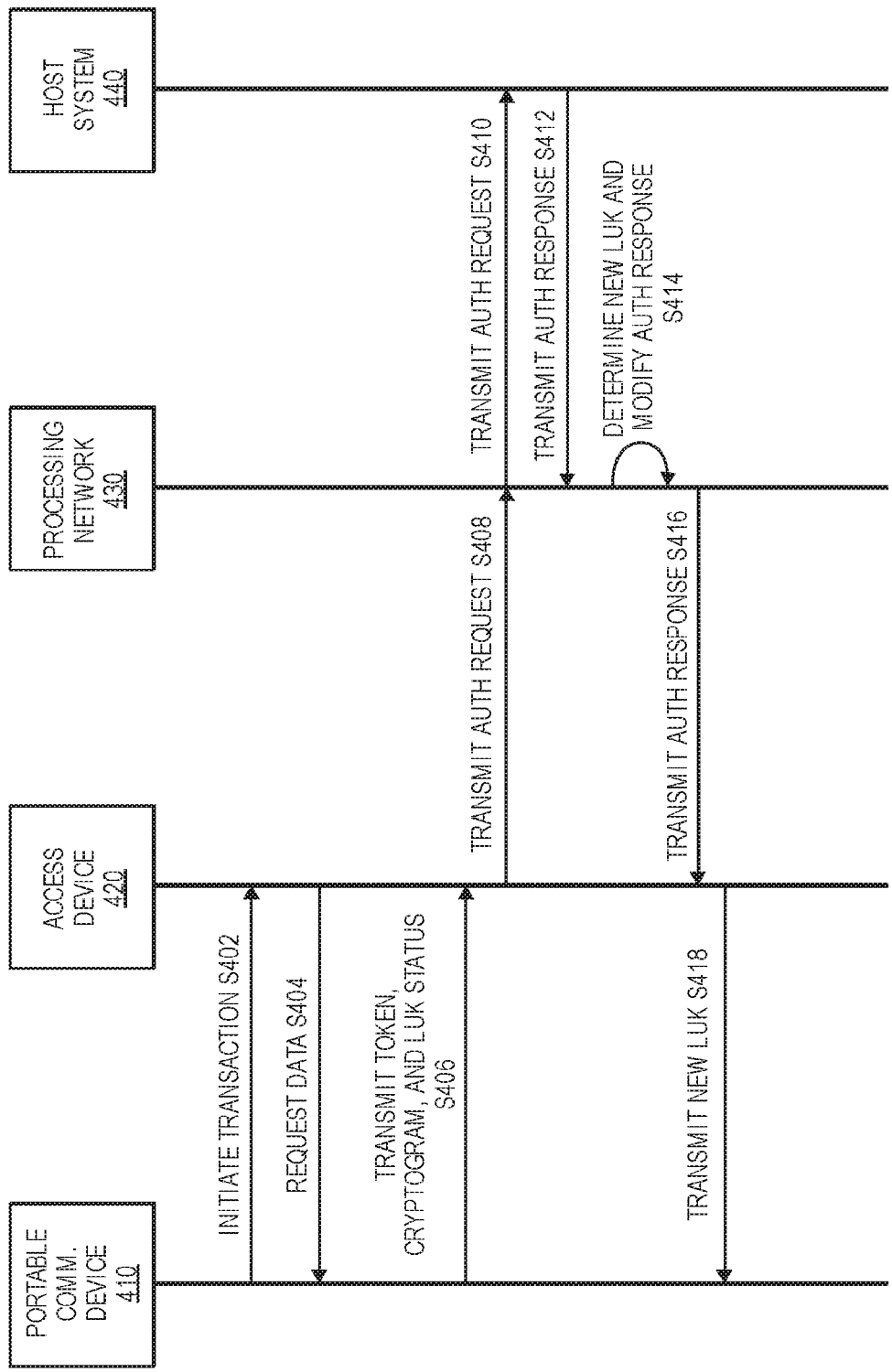
FIG. 4 shows a flow diagram illustrating another method for provisioning a limited use key in an authorization processing scheme, according to some embodiments.

FIG. 4 shows another embodiment of the invention. FIG. 4 shows the portable communication device 410 obtaining a new LUK from a processing network during an authorization process.

FIG. 4 shows a portable communication device 310, an access device 320, a processing network 330, and a host system 340, each in operative communication with each other. The process shown in FIG. 4 is efficient, as it involves a reduced number of steps compared to the embodiment in FIG. 3. For clarity of illustration, other entities (e.g., the token platform and a transport computer) that can be in the process flow in FIG. 4 have been omitted. It is understood that such entities may optionally be present in the flow as described above with respect to FIG. 1.

In step S402, a transaction is initiated by the portable communication device 410 and the access device 420. The portable communication device 310 may be tapped against a reader (or otherwise interact with the reader) in the access device 320. In some embodiments, this can start the series of messages that pass between the portable communication device 310 and the access device as shown in FIG. 2.

In step S404, the access device 420 requests data from the portable communication device 410. As mentioned above, in some embodiments, the request for data may occur in any of the messages that pass from the access device 260 to the portable communication device 201 in FIG. 2 (e.g., steps S202, S206, S210, S214). In other embodiments, the request may be a stand-alone request that is separate from the messages illustrated in FIG. 2.

In step S406, a series of message exchanges between the portable communication device 310 and the access device 320, such as those described above with respect to FIG. 2 may then take place. The portable communication device 410 may generate a cryptogram using the first LUK, and can transmit the cryptogram and the token corresponding to the new LUK, as well as the LUK status of the current LUK on the portable communication device 410 to the access device 420. The token may be a static or semi-static token which may have been previously stored on the portable communication device 410.

As noted above, in some embodiments, the access device 420 or the portable communication device 410 may have determined that the current LUK on the portable communication device 410 may expire soon or with the current transaction. The access device 420 may obtain an indicator to this effect, or may generate its own indicator and may include it in an authorization request message. The authorization request message may also include the token, the cryptogram generated using the current LUK, as well as a transaction amount. In other embodiments, neither the access device 420 nor the portable communication device determines that a new LUK is needed. In these other embodiments, a remote computer may make this determination on its own and may provide a new LUK in an authorization response message.

In step S408, the access device 420 transmits the authorization request message to the processing network 430 The processing network 430 may receive the authorization request, and may then determine a real account identifier associated with the token in the authorization request message. It may do so by communicating with the previously described token platform. Once the real account identifier is received by the processing network 430, it may modify the authorization request message so that it contains the real account identifier. The processing network 430 may also store the indicator that a new LUK is needed for the portable communication device 410.

The processing network 430 may also verify that the cryptogram that was generated with the current LUK that was received with the token is valid, and that the particular transaction being conducted is also consistent with the permissions provided by the cryptogram generated by the current LUK. In some embodiments, a computer in the processing network 330 may independently generate a cryptogram from an independently generated LUK (using previously stored information) or a stored copy of the current LUK that is present on the portable communication device 310. The computer in the processing network 330 may also compare the independently generated cryptogram with the cryptogram received in the authorization request message to verify the received cryptogram.

In step S410, the processing network 430 may transmit the authorization request message with the real account identifier, optionally the cryptogram, and the transaction amount to the host system 440. The host system 440 may thereafter determine if the transaction should or should not be authorized. The host system 440 could independently verify that the transaction being conducted is consistent with the cryptogram. The host system 440 may also perform its own transaction security checks (e.g., fraud checks) and may determine if the user has sufficient credit or funds to fund the transaction. After the host system 440 has made this determination, the host system 440 may then generate an authorization response message.

In step 412, after the host system 440 generates the authorization response message, the host system 440 may then transmit the authorization response message back to the processing network 322. The authorization response message may include the real account identifier and data indicating an approval or denial of the transaction. If the access device 420 or the portable communication device 410 determined that a new LUK was needed by the portable communication device 410, then the authorization response message may also include the indicator to generate a new LUK if the processing network 322 did not previously store it.

In step S414, after the processing network 330 receives the authorization response message, the processing network 330 may retrieve the token associated with the real account identifier, and may generate a modified authorization response message.

In step S414, the processing network 330 may also determine a new LUK and may modify the authorization response message to include the token and the new LUK. The processing network 330 may communicate with the token platform to verify that a new LUK can be issued to the portable communication device 410 and to obtain the token from the real account identifier. In some embodiments, the processing network 330 may determine that a new LUK is needed by acknowledging the indicator to provide a new LUK in the authorization request or response messages.

If the indicator to provide a new LUK was not provided in either of these messages, the processing network 330 may determine that a new LUK is needed on its own in some embodiments. For example, a computer in the processing network 330 may retrieve a key index indicating when the current LUK was generated from a data storage in the processing network 330, or from the authorization request message if it was transmitted from the portable communication device 410 to the access device 420 in step S406. It may also compare this data to other variable data such as current counters or timestamps to determine if a new LUK is to be issued. For example, if a key index indicates that the current LUK was generated at 12:00 p.m. on Jan. 1, 2017, the current transaction time and date is 11:50 a.m. on Jan. 7, 2017, and the current LUK has a lifetime of one week, then the processing network 430 may automatically determine that a new LUK can be issued, and can automatically generate the new LUK for the portable communication device 410. In another embodiment, if the key index includes a counter value of zero at the time that the current LUK is generated, the current value of a transaction counter is four (e.g., as received in an authorization request message or as retrieved from a data storage in the processing network 430), and the threshold for the issuance of a new LUK is five, then the processing network 430 may automatically determine that a new LUK can be issued, and can automatically generate the new LUK for the portable communication device 410.

In step S416, the processing network 430 may transmit the modified authorization response message including the token and the new LUK to the access device 420.

In step S418, after the access device 420 receives the authorization response message, the access device 420 may transmit the new LUK to the portable communication device 410. If the portable communication device 410 is no longer in communication with the access device 420, the access device 420 may request that the user present the portable communication device 410 to the access device 420 once more to update the portable communication device 410.

At the end of the day or at any other suitable time, a clearing and settlement process can take place between the processing network S430, a transport computer (not shown), and the host system 440.

In some embodiments, the mobile application may update a transaction verification log maintained by the mobile application at the end of a transaction to include information about the transaction in the transaction verification log. The mobile application may recognize the end of a transaction by recognizing that all transaction processing information and/or account data that may be needed by the access device to complete the transaction has been provided to the access device (e.g., recognizing that the last record defined in the AFL has been returned successfully or if no AFL, when the GPO response has been returned successfully).

Figure 5:
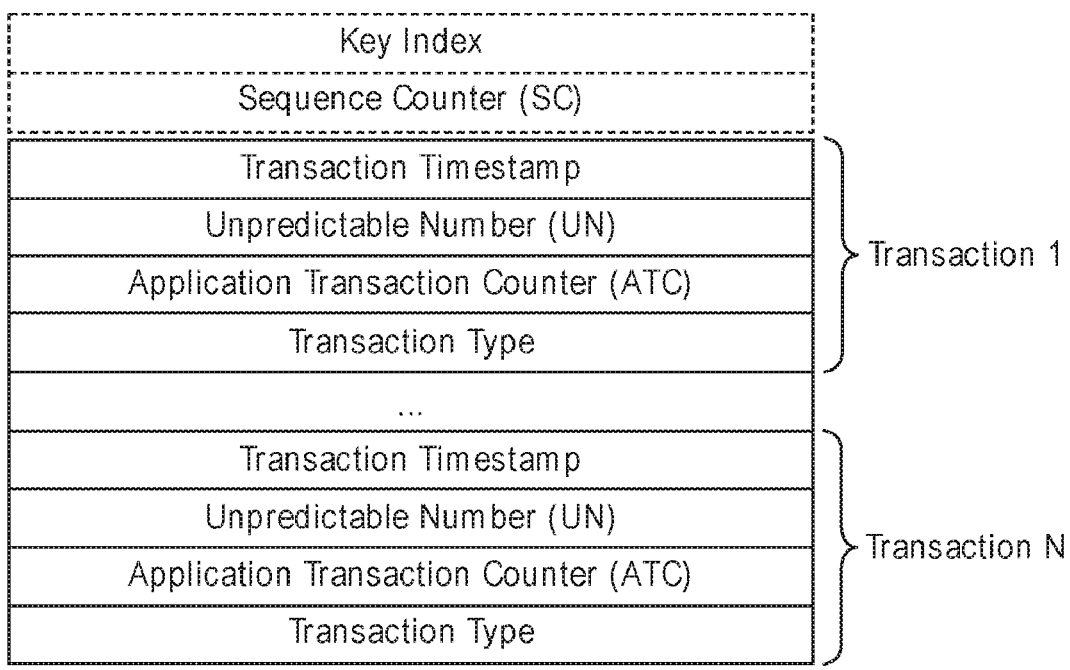
FIG. 5 illustrates an example of a transaction verification log, according to some embodiments.

FIG. 5 illustrates examples of data elements that can be included in a transaction verification log, according to some embodiments. The mobile application may maintain a transaction verification log per LUK or per set of account parameters. In some embodiments, the portable communication device may maintain a number of transaction verification logs for several LUKs or sets of account parameters, or optionally, once the current LUK or account parameters have been renewed or replenished, the transaction verification log corresponding to the previous LUK or account parameters can be deleted to save memory space. The transaction verification log information could be used by any suitable entity (e.g., an access device, processing network, or portable communication device) to determine if a new LUK can be issued.

The transaction verification log may be associated with and/or may include the key index corresponding to the LUK or set of account parameters used in the logged transactions, and a sequence counter value associated with the key index or set of account parameters indicating the number of times the LUK or set of account parameters have been replenished. For each transaction conducted using the particular LUK or particular set of account parameters, the transaction verification log may include a transaction timestamp indicating the time of the corresponding transaction, an unpredictable number (UN) provided from the access device during the transaction (if available), an application transaction counter (ATC) value associated with the corresponding transaction (e.g., a value indicating the number of transactions that has been conducted using the mobile application at the time of the transaction), and a transaction type indicator indicating whether the corresponding transaction was conducted as an integrated chip based transaction or a magnetic stripe based transaction. The transaction timestamp may be the UTC time as determined by the portable communication device at the time of the transaction.

Figure 6:
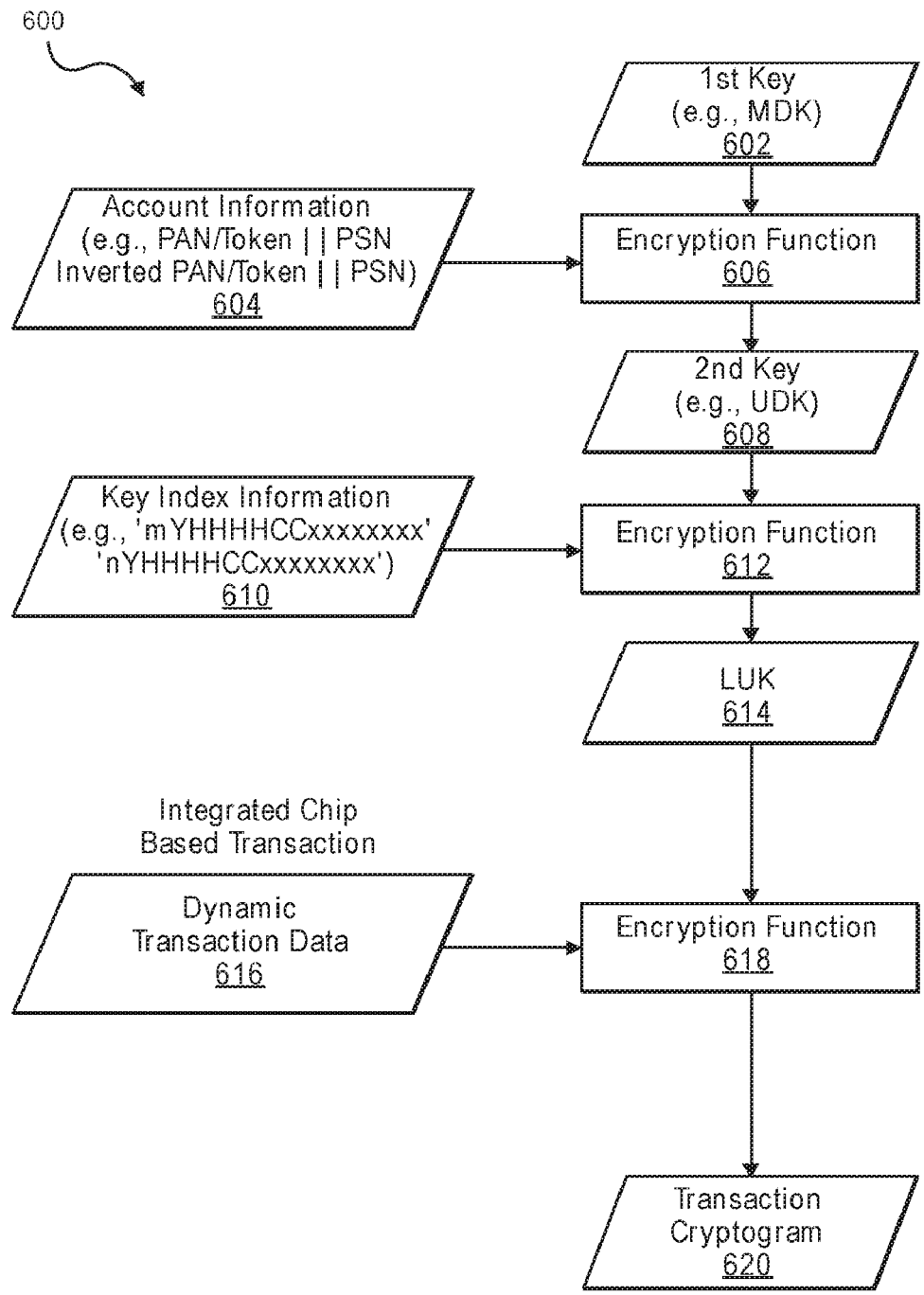
FIG. 6 illustrates an example of a process for generating a transaction cryptogram, according to some embodiments.

FIG. 6 illustrates a block diagram of an example of a process 600 for generating a transaction cryptogram, according to some embodiments. Any one of the encryption functions 606, 612, and/or 618 can be the same or be different than any of the other encryption functions. For example, any one of the encryption functions may be implemented as triple data encryption standard (IDES), data encryption standard (DES), advanced encryption standard (AES), or other suitable encryption algorithms.

Process 600 can be divided into two parts—the first part relates to the LUK generation (blocks 602 to 614), which may be performed by a processing network, token platform, or host system; and the second part relates to the transaction cryptogram generation (blocks 616-620), which may be performed by a portable communication device. The first part relating to the LUK generation can be performed once to generate a LUK, and the second part relating to the transaction cryptogram generation can be performed multiple times using the LUK generated from the first part (e.g., by the mobile application) until the LUK has exceeded its set of one or more limited-use thresholds, at which time, the first part relating to the LUK generation can be performed again (e.g., by a token platform, processing network or issuer system) to replenish, renew, or refresh the LUK.

Process 600 may begin by encrypting account information 604 with a first encryption key 602 using an encryption function 606 to generate a second encryption key 608. The first encryption key 602 may be a base key that is associated with the issuer of the user's account, and the base key may be associated with a group of accounts. For example, the first encryption key 602 may be associated with a group of accounts within a range for HCE type transaction accounts. In some embodiments, the first encryption key 602 may be a master derivation key (MDK) associated with the issuer of the account associated with the account information 604, and the first encryption key 602 can be maintained at the processing network or the host system.

The account information 604 may include account identifying information such as an account identifier (e.g., a PAN), an alternate account identifier (e.g., an alternate PAN), or a token that is a substitute for an account identifier, and may additionally include user identifying information such as a sequence number (e.g., a PAN sequence number (PSN)) that identifies the particular user of the account (e.g., when multiple users use the same account). For example, the account information 604 that is used as the input to encryption function 606 can be a concatenation of the account identifying information and the user identifying information, or an inverted version of the concatenation.

In some embodiments, the second encryption key 608 being generated from the account information 604 may include multiple portions that are each generated from different variations of the account information 604. For example, the second encryption key 608 may be divided into two portions. The first portion of the second encryption key 608 may be generated by encrypting the account information 604 using the first encryption key 602. The second portion of the second encryption key 608 may be generated by inverting the account information 604 and encrypting the inverted account information using the first encryption key 602. The encryption function 606 used to generate the second encryption key 608 may be, for example, triple data encryption standard (TDES), and may use an initial chaining vector of binary zeros. In some embodiments, the second encryption key 608 generated from the account information 604 may correspond to a unique derivation key (UDK) for the account.

Process 600 may continue by encrypting key index information 610 with the second encryption key 608 using an encryption function 612 to generate the limited-use key (LUK) 614. The key index information 610 may be derived from a key index that includes information pertaining to the generation of the LUK 614, and that may be used as a seed to generate LUK 614. For example, the key index may include time information indicating when the LUK 614 is being generated. In some embodiments, the time information can be represented as the numeric string 'YHHHH', where 'Y' (0-9) represents the least significant digit of the current year, and 'HHHH' (0001-8784) represents the number of hours since the start of January $1^{st}$ of the current year expressed as digits (e.g., first hour of January $1^{st}$=0001). In some embodiments, the key index may also include a replenishment counter value indicating the number of times that the LUK 614 has been renewed or replenished in a predetermined time period (e.g., number of times LUK 614 has been generated in each hour). For example, the replenishment counter value can be represented as the numeric string 'CC' (00-99). At the beginning of each hour, 'CC' starts at 00 and is incremented by 1 each time LUK 614 is generated. In some embodiments, the key index may include an ATC value, or a pseudo random number generated by the processing network or the issuer.

In some embodiments, the key index information 610 that is provided as input to the encryption function 612 may be generated by padding the key index with numeric values. For example, the key index can be padded with a numeric value (e.g., 1 or 2 shown as 'm' or 'n' in FIG. 6) at the beginning of the key index and/or a numeric value (e.g., 80000000 shown as 'xxxxxxxx' in FIG. 6) at the end of the key index. In some embodiments, the LUK 614 being generated from the key index information 610 may include multiple portions that are each generated from different variations of the key index information 610. For example, the LUK 614 may be divided into two portions. The first portion of LUK 614 may be generated by padding the key index with a first value to generate a first padded key index (e.g., 1YHHHHCC80000000), and encrypting the first padded key index using the second encryption key 608. The second portion of LUK 614 may be generated by padding the key index with a second value to generate a second padded key index (e.g., 2YHHHHCC80000000), and encrypting the second padded key index using the second encryption key 608. The encryption function 612 used to generate the LUK 614 may be, for example, TDES or other suitable encryption algorithms, and may use an initial chaining vector of binary zeros.

After the LUK 614 is generated (e.g., by the processing network, token platform, or the host computer), the LUK 614 and the key index that includes information pertaining to the generation of LUK 614 may be provided to a portable communication device to facilitate generation of transaction cryptograms. The LUK may be associated with a set of one or more limited-use thresholds that limit the number of transactions that can be conducted using the LUK 614, such as those described herein. The data relating to the specific thresholds for an LUK may be stored remotely at a processing network, token platform, or host system.

For an integrated chip based transaction, the transaction cryptogram 620 may be generated by encrypting dynamic transaction data 616 using the LUK 614 as an encryption key in encryption function 618. The dynamic transaction data 616 may include, for example, some or all of the terminal transaction data provided from the access device to the mobile application of the portable communication device during execution of the transaction. In some embodiments, the dynamic transaction data 616 may include the following data elements: authorized amount, other amount, terminal country code, terminal verification results, transaction currency code, transaction date, transaction type, and unpredictable number; and/or may include the application interchange profile (AIP), application transaction counter (ATC), and issuer application data (IAD). In some embodiments, some data elements may be omitted, and/or additional data elements not specifically described can be included. The data set that makes up the dynamic transaction data 616 is provided as input to the encryption function 818. In some embodiments, the transaction cryptogram 620 can be generated by enciphering the dynamic transaction data 616 using a first portion of the LUK 614, deciphering the enciphered dynamic transaction data using a second portion of the LUK 614, and then re-enciphering the deciphered dynamic transaction data using the first portion of the LUK 614.

Figure 7:
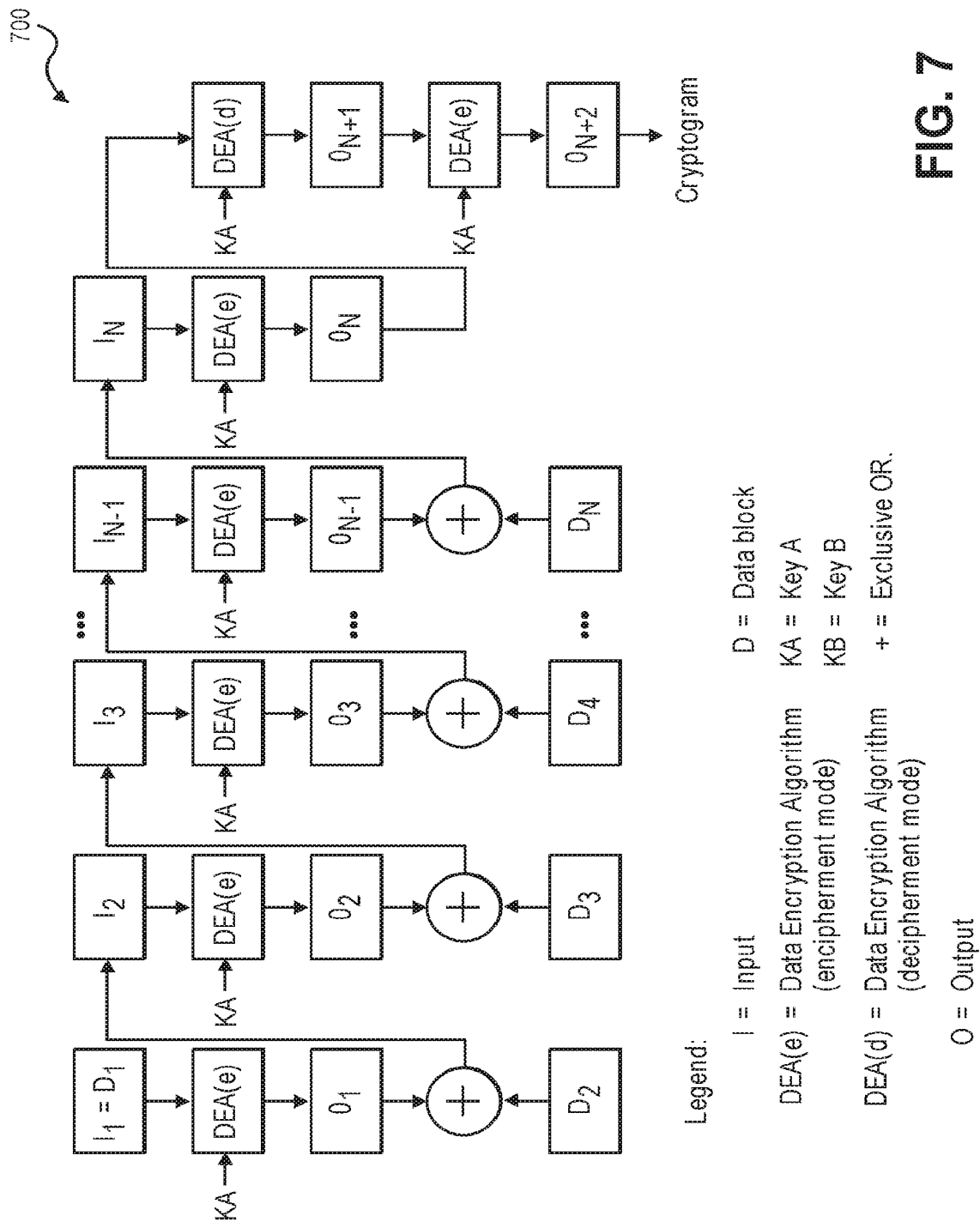
FIG. 7 illustrates an example of an encryption function, according to some embodiments.

FIG. 7 illustrates a block diagram of an example of encryption function 700, according to some embodiments. In some embodiments, encryption function 700 can be used as encryption function 618. For example, the data set that makes up the dynamic transaction data 616 may be concatenated together (e.g., in the order described above), and then divided into a set of data blocks $D_1$ to $D_N$ of equal length (e.g., 8-byte data blocks). If the dynamic transaction data 616 does not divide equally into the length of the data blocks, the missing least significant bits in the last data block $D_N$ can be zero filled. The first key KA may correspond to a first portion of the LUK 614 (e.g., most significant 8 bytes), and the second key KB may correspond to a second portion of the LUK 614 (e.g., least significant 8 bytes) An iterative enciphering process may be applied to the set of data blocks $D_1$ to $D_N$. The iterative enciphering process may include encrypting a first data block $D_1$ using key KA as the encryption key in a data encryption algorithm (DEA(e)). The result of the encryption is then exclusive-ORed with the next data block $D_2$. The result of the exclusive-OR operation is then used as the input for the next iteration of the enciphering process. The enciphering process continues until all data blocks $D_1$ to $D_N$ has been processed, and the output $I_N$ of the last exclusive-OR operation with the last data block $D_N$ is encrypted to form the output of the iterative enciphering process $O_N$. The output of the of the iterative enciphering process $O_N$ may then be deciphered using key KB as the decryption key in data decryption algorithm (DEA(d)). The output of the deciphering process $O_{N+1}$ is then re-enciphered using key KA as the encryption key in a data encryption algorithm (DEA(e)) to generate the output $O_{N+2}$. According to some embodiments, the output $O_{N+2}$ can be used as the transaction cryptogram 620.

Figure 8:
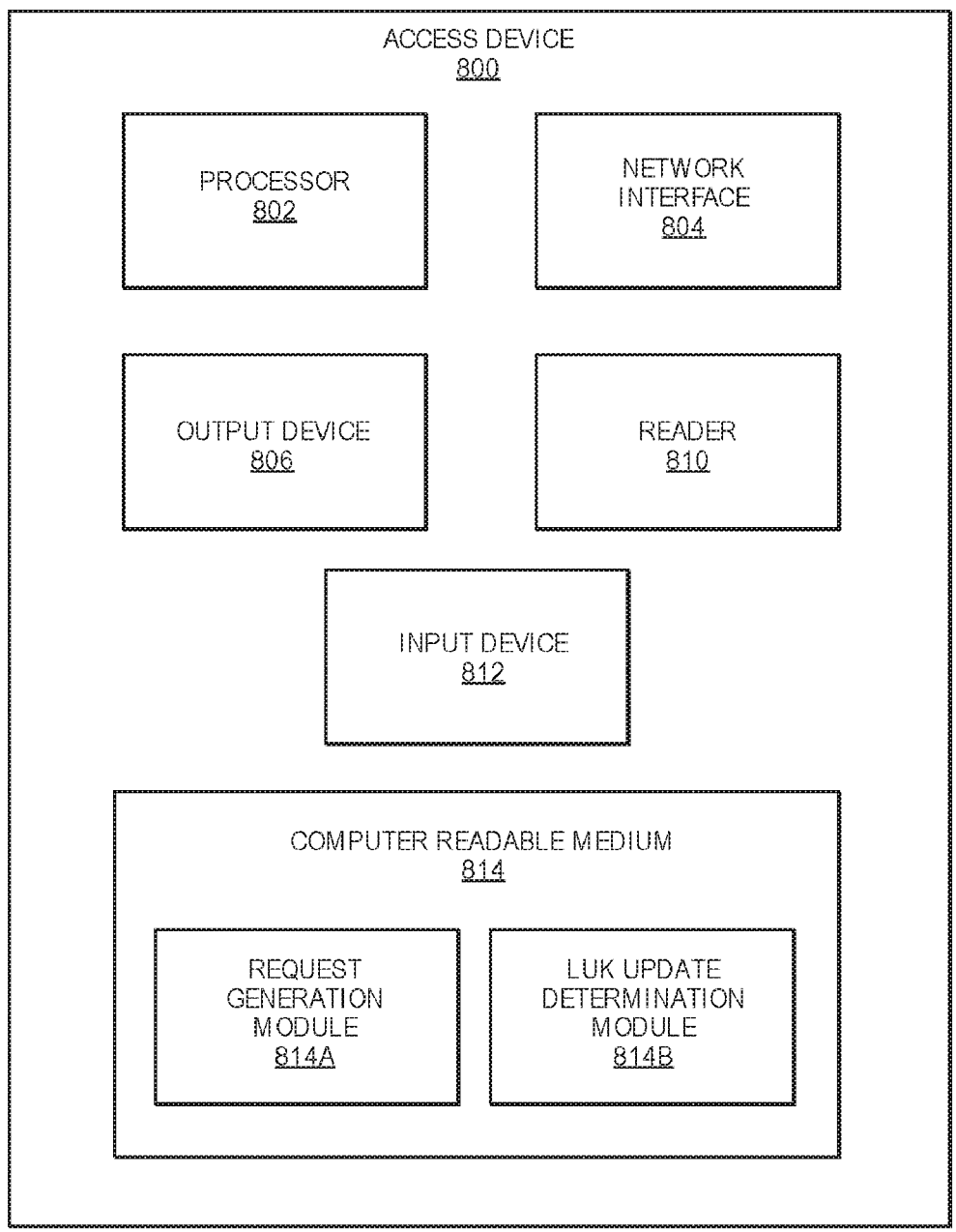
FIG. 8 shows a block diagram of an access device, according to an embodiment of the invention.

FIG. 8 shows a block diagram of an access device 800 according to an embodiment of the invention. The access device 800 includes a processor 802. A network interface 804, an output device 806 (e.g., a display screen, speaker, etc.), a reader 810 (e.g., a contactless or contact-based device reader), an input device 812 (e.g., a keyboard, touchscreen, etc.), and a non-transitory computer readable medium 814 may be operatively coupled to the access device 800.

The non-transitory computer readable medium 814 may comprise a request generation module 814A and an LUK update determination module 814B.

The request generation module 814A may comprise code executable by the processor 802 to generate and transmit authorization request messages and/or LUK request message as described above.

The LUK update determination module 814B may comprise code, which may be executable by the processor 802 to determine if an LUK on a portable communication device is to be updated or not. In some embodiments, it may comprise code for determining based upon data in a transaction verification log, and/or the current LUK residing in the portable communication device is expired or is about to expire in the near future or in the next transactions conducted with the portable communication device.

Figure 9:
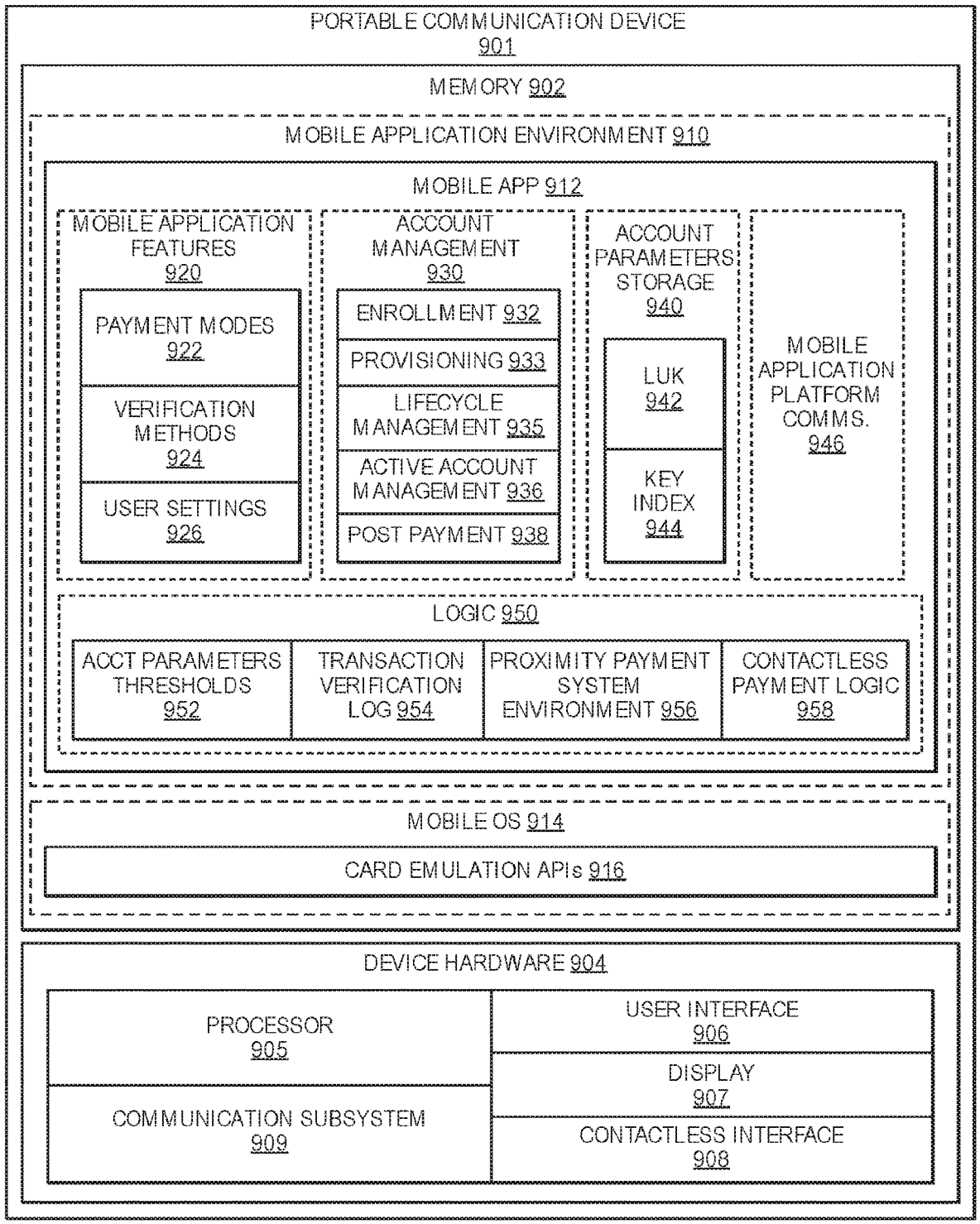
FIG. 9 shows a block diagram of a portable communication device, according to an embodiment of the invention.

FIG. 9 illustrates a detailed block diagram of a portable communication device 901, according to some embodiments. Portable communication device 901 may include device hardware 904 and memory 902. Device hardware 904 may include a processor 905, a communications subsystem 909, a user interface 906, a display 907 (which may be part of user interface 906), and a contactless interface 908. Processor 905 can be implemented as one or more integrated circuits (e.g., one or more single core or multicore microprocessors and/or microcontrollers), and is used to control the operation of portable communication device 901. Processor 905 can execute a variety of programs in response to program code or computer-readable code stored in memory 902, and can maintain multiple concurrently executing programs or processes. Communications subsystem 909 may include one or more RF transceivers and/or connectors that can be used by portable communication device 901 to connect with external networks (e.g., communication network 192) and communicate with other devices. User interface 906 can include any combination of input and output elements to allow a user to interact with and invoke the functionalities of portable communication device 901. In some embodiments, display 907 may be part of user interface 906.

Contactless interface 908 may include one or more RF transceivers to interact with a contactless reader of an access device. In secure element based implementations, only the secure element may have access to contactless interface 908. In the cloud-based payments techniques described herein, contactless interface 908 can be accessed by the mobile OS 914 without requiring the user of a secure element. In some embodiments, display 907 can also be part of contactless interface 908, and is used, for example, to perform transactions using QR codes, bar codes, etc.

Memory 902 can be implemented using any combination of any number of non-volatile memories (e.g., flash memory) and volatile memories (e.g., DRAM, SRAM), or any other non-transitory storage medium, or a combination thereof media. Memory 202 may store a mobile OS 914 and a mobile application environment 910 where one or more mobile applications reside including mobile application 912 (e.g., a mobile wallet application, mobile payment application, etc.) to be executed by processor 905. Mobile OS 914 may implement a set of card emulation APIs 916 that can be invoked by mobile application 912 to access contactless interface 208 to interact with an access device.

For some payments implementations, the payment system environment (e.g., PPSE) and mobile payment application functionalities are consolidated into mobile application 912, whereas secure element based implementations may provide some or all of these functionalities from a secure element. Mobile application 912 may include payments logic 950. Payments logic 950 may include contactless payment logic 958, proximity payment system environment (PPSE) logic 956, transaction verification log 954, and account parameters thresholds 952 (e.g., set of one or more limited-use thresholds associated with LUK 942). Contactless payment logic 958 may include functionalities that enable contactless communications to carried out to conduct a contactless transaction with a contactless reader of an access device. PPSE logic 956 is used to inform the access device which payment product is available on mobile application 912. The access device then uses this information to select the payment account to initiate a contactless transaction. Transaction verification log 954 can be used for post-payment support or to determine if a new LUK can be issued to the portable communication device 901. Mobile application 912 may maintain transaction verification log 954 (can be hidden from the consumer) retaining transaction details for transactions initiated from mobile application 912. Mobile application 912 may also use the transaction verification log 954 to support active account management processes and post payment interactions. Account parameters thresholds 952 (e.g., limited-user thresholds) are initially configured and can potentially be updated with different thresholds to inform mobile application 912 when to initiate a request for updated account parameters (e.g., time-to-live, number of transactions, cumulative transaction amount, etc.).

Mobile application 912 may also include account parameter storage 940 and mobile application platform (MAP) communications logic 946. Account parameter storage 940 stores the account parameters (e.g., account identifier or alternate account identifier or token, LUK 942, key index 944, etc.) that are used to initiate a payment transaction. MAP communications logic 946 is used to enable secure communications with a mobile application platform (MAP) in order to request, send, and receive information to manage a user's cloud-based payment accounts. This may include logic to consume and process information for account management logic 930.

Account management logic 930 includes logic to process information for payments services such as enrollment logic 932, provisioning logic 933, active account management logic 936, lifecycle management logic 934, and post payment interactions logic 938. Enrollment logic 932 includes logic for a consumer to initiate the enrollment of an account to the payment service. Provisioning logic 933 includes logic to process the issuer data to configure the account into mobile application 912, including the provisioning of the initial account parameters. Active account management logic 936 can be used to initiate a request with MAP to update the account parameters when account parameter thresholds have been exceeded. Lifecycle management logic 934 may include logic to initiate and process account lifecycle events such as consumer initiated delete, issuer-initiated delete, issuer-initiated suspend, and/or issuer-initiated resume, etc. Post payment interactions logic 938 is used to support payment verification. Post payment interactions logic 938 may include logic to receive and respond to requests from MAP for transaction verification log 954. Post payment interactions logic 238 can be used to support account parameters replenishment, and may include logic to extract information from transaction verification log 954 to send to MAP as part of an account parameter replenishment request.

Mobile application 912 may also include mobile application features 920. Mobile application features 920 may include consumer verification methods (CVM) logic 924, payment modes 922, and user settings 926. CVM logic 924 may include logic to confirm a mobile application passcode or on-device verification method (e.g., screen lock), or other verification information method supported by mobile application 912. Payment modes 922 may include logic to support various ways of setting up mobile application 912 and portable communication device 901 to be ready to initiate a transaction, and may include support for Manual Mode and/or Always-On Mode.

Manual Mode is a state where mobile application 912 is configured to be accessible for making a payment after the consumer has explicitly chosen to (1) open mobile application 912, (2) entered user input for a consumer verification method if required, and (3) selected an account to make a contactless payment transaction and for a single transaction or limited time. For Manual Mode, a decision can be made whether a consumer device cardholder verification method (CDCVM) will be required prior to making payment. If a CDCVM is used, then the two-tap scenario for high-value transactions may not be necessary. Conversely, to reduce barriers to use, if an issuer decides to opt for not asking for a CDCVM in Manual Mode, then the consumer will be able to conduct transactions once the conditions for Manual Mode operation are met. In this latter scenario, mobile application 912 may support entry of CDCVM if a CDCVM is requested during a high value payment.

Always-On Mode is a state where an account on portable communication device 901 (a default account) is to be continuously accessible to a contactless reader. A portable communication device with an account set in this state allows a consumer to initiate a contactless payment transaction by the presentation of the portable communication device to a contactless reader.

Although the specific examples provided above can relate to payment processing using payment tokens, it is understood that embodiments of the invention can be used in other environments that do not require payments. For example, embodiments of the invention may be used to access locations such as buildings, access data from remote servers, etc.

Embodiments of the invention have a number of advantages. For example, by allowing a limited use encryption key in a portable communication device to be updated via an access device such as a POS terminal, the portable communication device need not be in long range over-the-air communication with a remote provisioning server computer. Further, the portable communication device need not even have the ability to communicate with the remote provisioning server computer via a long range over-the-air communication mechanism. Still further, embodiments of the invention can advantageously reduce the number of communications and interactions compared to conventional provisioning processes. As noted above, in some embodiments, a limited use encryption key can be updated during a transaction authorization process. A separate provisioning message set is not required in some embodiments of the invention.

It should be understood that the present invention as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the present invention using hardware and a combination of hardware and software.

Any of the software components or functions described herein, may be implemented as software code to be executed by a processor using any suitable computer language such as, for example, Java, C++ or Perl using, e.g., conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses in a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
    receiving, by a remote server, an authorization request message from an access device during a transaction between the access device and a portable communication device, the portable communication device comprising a first limited use key;
    determining, by the remote server, a second limited use key;
    modifying, by the remote server, an authorization response message to include the second limited use key; and
    transmitting, by the remote server, the modified authorization response message comprising the second limited use key to the access device,
    wherein the authorization request message further comprises a token and a cryptogram obtained by the access device from the portable communication device, the cryptogram generated with the first limited use key, and wherein the method further comprises:
    verifying, by the remote server, the cryptogram.

2. The method of claim 1, wherein the method further comprises:
    transmitting, by the remote server, the authorization request message to a host system, wherein the host system determines if the transaction should or should not be authorized and generates the authorization response message; and
    receiving, by the remote server, the authorization response message from the host system comprising data indicating an approval or denial of the transaction.

3. The method of claim 1, wherein determining the second limited use key further comprises:

determining, by the remote server, if the second limited use key is to be issued to the portable communication device based on a counter or timestamp.

4. The method of claim 1, wherein the remote server is in a processing network.

5. The method of claim 1, wherein the authorization request message further comprises an indicator that indicates that the first limited use key will expire soon or expire with the transaction, wherein after receiving the authorization request message the method further comprises:
storing, by the remote server, the indicator.

6. The method of claim 5, wherein determining the second limited use key further comprises:
determining, by the remote server, that the second limited use key is needed by acknowledging the indicator.

7. The method of claim 1, wherein the access device is a point of sale terminal, and the portable communication device is a card or a wearable device.

8. The method of claim 1, wherein the authorization request message comprises a transaction amount.

9. The method of claim 1, wherein the token is a payment token.

10. A method comprising:
receiving, by a remote server, an authorization request message from an access device during a transaction between the access device and a portable communication device comprising a first limited use key;
determining, by the remote server, a second limited use key;
modifying, by the remote server, an authorization response message to include the second limited use key; and
transmitting, by the remote server, the modified authorization response message comprising the second limited use key to the access device, wherein the access device, after receiving the modified authorization response message, transmits the modified authorization response message to the portable communication device, wherein the portable communication device replaces the first limited use key with the second limited use key.

11. A remote server comprising:
a processor; and
a non-transitory computer readable medium, the non-transitory computer readable medium comprising code, executable by the processor to implement a method comprising:
receiving an authorization request message from an access device during a transaction between the access device and a portable communication device comprising a first limited use key;
determining a second limited use key;
modifying an authorization response message to include the second limited use key; and
transmitting the modified authorization response message comprising the second limited use key to the access device, wherein the authorization request message further comprises a token and a cryptogram, which are obtained by the access device from the portable communication device, wherein the cryptogram is generated using the first limited use key, and the method further comprises:
verifying, by the remote server, the cryptogram;
determining a real account identifier associated with the token; and
modifying the authorization request message to include the real account identifier.

12. The remote server of claim 11, wherein the remote server is a processing network.

13. The remote server of claim 11, wherein determining the real account identifier further comprises: retrieving the real account identifier from a token platform.

14. The remote server of claim 11, wherein verifying the cryptogram further comprises: verifying that the cryptogram was generated with the first limited use key; and verifying that transaction is consistent with permissions provided by the cryptogram.

15. The remote server of claim 11, wherein determining the second limited use key further comprises: encrypting account information with a first encryption key using a first encryption function to generate a second encryption key; and encrypting key index information with the second encryption key using a second encryption function to generate the second limited use key.

16. The remote server of claim 15, wherein the first encryption key is a base key or a master derivation key, wherein the key index information is derived from a key index that includes information pertaining to the generation of the second limited use key, and wherein the first encryption function is implemented as triple data encryption standard, data encryption standard, or advanced encryption standard, and wherein the second encryption function is implemented as triple data encryption standard, data encryption standard, or advanced encryption standard.

17. The remote server of claim 11, wherein obtaining the method further comprises: transmitting, by the remote server, the authorization request message to a host system, wherein the host system determines if the transaction should or should not be authorized and generates the authorization response message; and receiving, by the remote server, the authorization response message from the host system comprising data indicating an approval or denial of the transaction.

18. The remote server of claim 11, wherein the authorization request message further comprises an indicator that indicates that the first limited use key stored by the portable communication device will expire soon or expire with the transaction.

19. A method comprising:
receiving, by a host system, an authorization request message during a transaction between a portable communication device and an access device from a processing network, wherein the authorization request message comprises a real account identifier and an indicator that indicates that a first limited use key stored by the portable communication device will expire soon or expire with the transaction, wherein the authorization request message requests authorization for the transaction;
determining, by the host system, if the transaction should or should not be authorized;
generating, by the host system, an authorization response message comprising the real account identifier, data indicating an approval or denial of the transaction, and the indicator; and
transmitting, by the host system, the authorization response message to the processing network, wherein the processing network determines a second limited use key, modifies the authorization response message to include the second limited use key, and transmits the modified authorization response message comprising the second limited use key to the access device.

20. The method of claim 19, wherein the authorization request message further comprises a cryptogram, wherein the method further comprises:

verifying, by the host system, that the transaction is consistent with the cryptogram.

\* \* \* \* \*